US011873866B2

(12) United States Patent
Quinn

(10) Patent No.: US 11,873,866 B2
(45) Date of Patent: Jan. 16, 2024

(54) TRANSMISSION SYSTEM

(71) Applicant: ZEROSHIFT TRANSMISSIONS LIMITED, Milton Keynes (GB)

(72) Inventor: Neil Quinn, Port Talbot West Glamorgan (GB)

(73) Assignee: ZEROSHIFT TRANSMISSIONS LIMITED, Milton Keynes (GB)

( * ) Notice: Subject to any disclaimer, the term of this patent is extended or adjusted under 35 U.S.C. 154(b) by 54 days.

(21) Appl. No.: 17/416,437

(22) PCT Filed: Sep. 2, 2019

(86) PCT No.: PCT/GB2019/052444
§ 371 (c)(1),
(2) Date: Jun. 18, 2021

(87) PCT Pub. No.: WO2020/128412
PCT Pub. Date: Jun. 25, 2020

(65) Prior Publication Data
US 2022/0120321 A1    Apr. 21, 2022

(30) Foreign Application Priority Data
Dec. 19, 2018 (GB) ..................... 1820750

(51) Int. Cl.
*F16H 3/00* (2006.01)
*F16H 61/04* (2006.01)
(Continued)

(52) U.S. Cl.
CPC ............. *F16D 11/10* (2013.01); *F16H 3/006* (2013.01); *F16H 61/0437* (2013.01);
(Continued)

(58) Field of Classification Search
CPC .... F16H 3/006; F16H 61/0437; F16H 61/688; F16H 63/18; F16H 63/30; F16H 2003/007; F16H 2063/3093; F16H 2200/0034
(Continued)

(56) References Cited

U.S. PATENT DOCUMENTS 2,466,318 A * 4/1949 Kohr ......................... F16H 3/10
74/330
3,769,857 A * 11/1973 Whateley .............. F16H 3/0915
74/330
(Continued)

FOREIGN PATENT DOCUMENTS

JP   2015-081634 A   4/2015
KR   2013-0133656    12/2013
WO   WO 2012/164237 A1   12/2012

OTHER PUBLICATIONS

Search Report in Application No. GB1820750.6, dated Jun. 13, 2019.
(Continued)

*Primary Examiner* — Ha Dinh Ho
(74) *Attorney, Agent, or Firm* — Knobbe, Martens, Olson & Bear, LLP

(57) ABSTRACT

A transmission system including a first gear rotatably mounted on an input shaft; a second gear mounted on a lay shaft; a selector that selectively locks first and second gears for rotation with the input shaft and includes a single engagement ring with a first side having a first set of engagement elements each having a drive face that drivingly engages in a first rotational direction a first set of drive formations of the first gear and a non-driving face that slips with respect to the first set of drive formations in a second rotational direction, and a second side having a second set of engagement elements each having a drive face that drivingly
(Continued)

engages in the second rotational direction a second set of drive formations of the second gear and a non-driving face that slips with respect to the second set of drive formations in the first rotational direction.

34 Claims, 24 Drawing Sheets

(51) Int. Cl.
  *F16H 61/688* (2006.01)
  *F16H 63/30* (2006.01)
  *F16D 11/10* (2006.01)
  *F16H 63/18* (2006.01)

(52) U.S. Cl.
  CPC ........... *F16H 61/688* (2013.01); *F16H 63/18* (2013.01); *F16H 63/30* (2013.01); *F16H 2003/007* (2013.01); *F16H 2063/3093* (2013.01); *F16H 2200/0034* (2013.01)

(58) Field of Classification Search
  USPC .......................................... 74/330, 335, 331
  See application file for complete search history.

(56) References Cited

U.S. PATENT DOCUMENTS

| | | | | |
|---|---|---|---|---|
| 4,576,063 | A * | 3/1986 | Akashi | F16H 3/006 |
| | | | | 74/331 |
| 4,622,866 | A * | 11/1986 | Ito | F16H 3/10 |
| | | | | 477/122 |
| 8,677,860 | B2 * | 3/2014 | Nishida | B60K 6/387 |
| | | | | 74/665 B |
| 10,047,828 | B2 * | 8/2018 | Eo | F16H 3/006 |
| 11,454,301 | B2 * | 9/2022 | Galsworthy | F16H 61/688 |
| 2014/0326093 | A1 | 11/2014 | Martin et al. | |
| 2015/0211633 | A1 | 7/2015 | Thompson | |
| 2016/0146344 | A1 | 5/2016 | Tsukamoto et al. | |
| 2017/0234408 | A1 | 8/2017 | Thompson | |
| 2018/0135751 | A1 * | 5/2018 | Maki | F16H 63/32 |
| 2018/0195608 | A1 | 7/2018 | Thompson | |
| 2018/0328487 | A1 * | 11/2018 | Nishimoto | F16H 63/3416 |

OTHER PUBLICATIONS

International Search Report and Written Opinion for PCT/GB2019/052444 dated Nov. 4, 2019 in 10 pages.

* cited by examiner

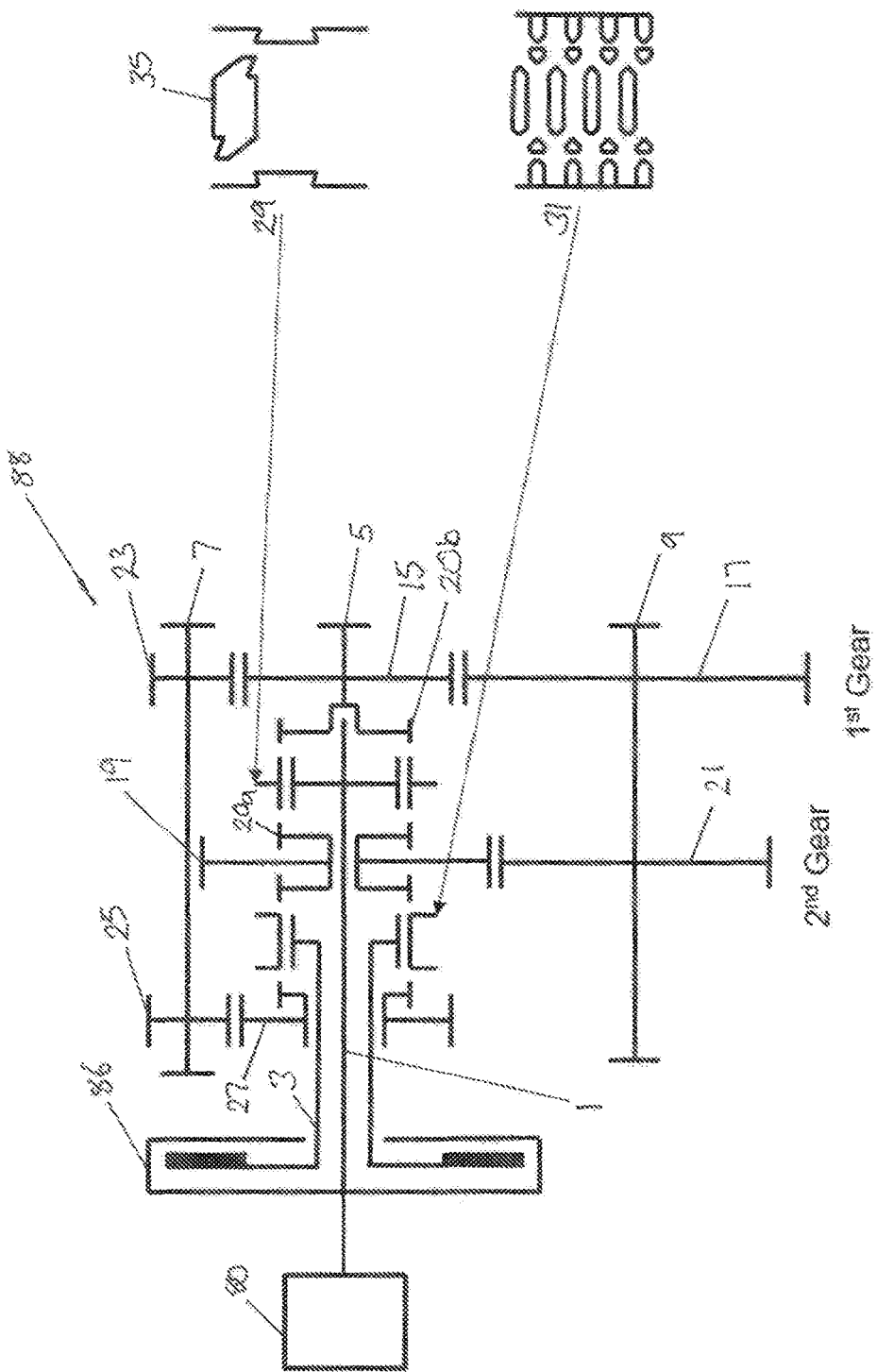

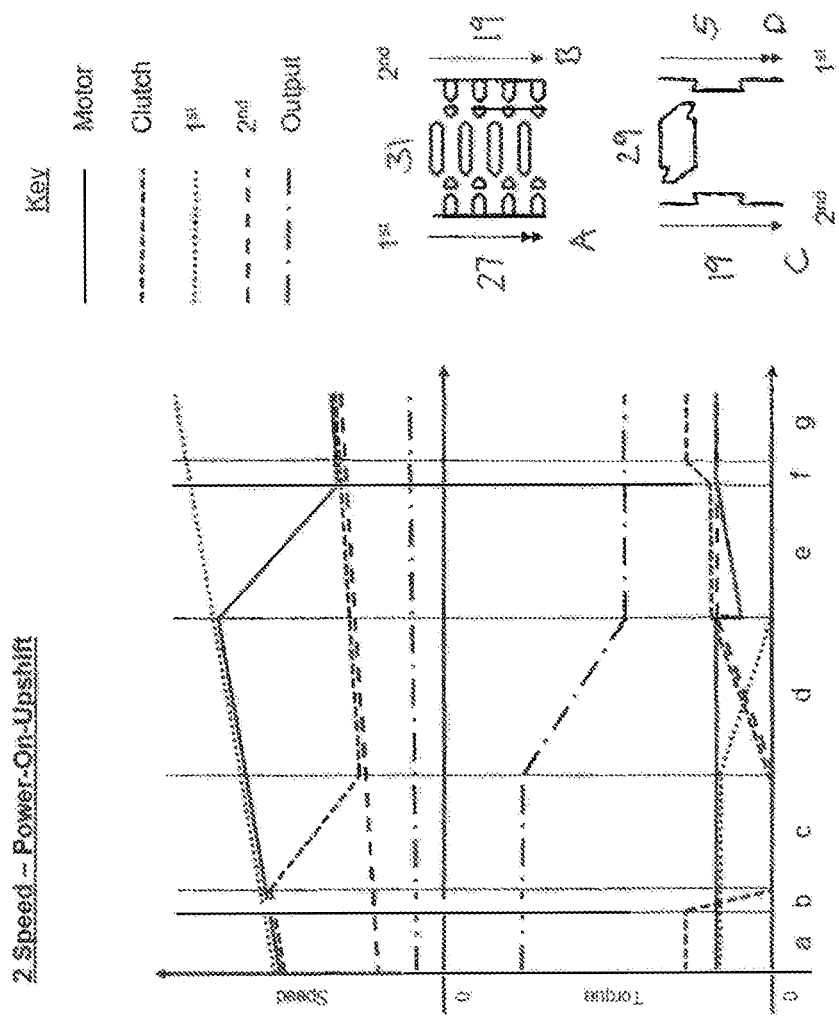
Fig. 4
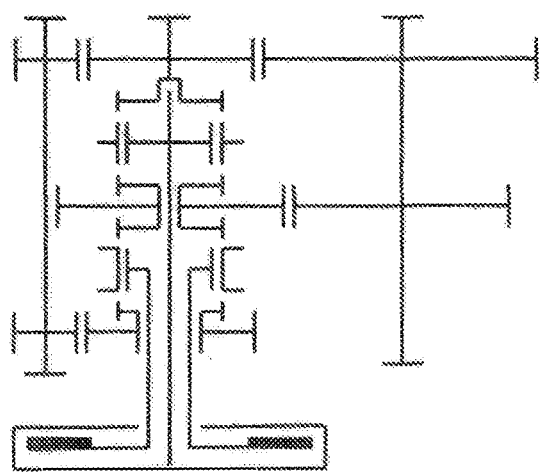

TRANSMISSION SYSTEM

The present invention relates to a transmission system, in particular to a transmission system that is configured for use in vehicles having an electric motor for providing drive to the wheels, and a selector assembly for use in the transmission system.

In conventional single clutch synchromesh transmission systems for vehicles it is necessary to disengage the transmission from the power source, such as an engine or motor, by operating the clutch before the current gear is deselected and the new gear is engaged. If the power is not disengaged when attempting to engage a new gear the synchromesh is unable to engage the new gear element or has to be forced into engagement with the risk of damaging the transmission and creating torque spikes in the transmission. This is because in most cases the speed of the engine is not matched to the speed of the new gear. For motor vehicles such as cars having conventional gearboxes and powered by an engine, the selection of a new gear ratio typically takes between 0.5 and 1 second to complete. So, for example, when a higher gear is selected the time delay allows the engine to reduce its speed [due to its own inertia] to more closely match the speed of the new gear before the clutch re-connects the engine and the transmission, thereby reducing the possibility of torque spikes occurring when the power is reapplied.

Dual Clutch Transmission (DCT) systems have tried to address this problem by using two clutches to handover the transfer of torque seamlessly when shifting between gears. However there are a number of drawbacks to DCTs, for example they require the use of two friction clutches which are heavy and expensive, they are complex to control and have parasitic losses and therefore are not very efficient.

Another type of seamless transmission system is referred to as an instantaneous type transmission system. This family of transmission systems includes at least one selector assembly that includes first and second sets of engagement elements that are arranged to selectively engage drive formations on the or each gear element associated with it. The first and second set sets of engagement elements are arranged such that a new gear can be selected while the current gear is still engaged and therefore the new gear can be selected under power for some shift types. A selector assembly of this type has four modes of operation with respect to the or each rotatably mounted gear element associated with it: fully engaged in both torque directions (fully in gear); disengaged in both torque directions (neutral); engaged in the forward torque direction while disengaged in the reverse torque direction; and disengaged in the forward torque direction while engaged in the reverse torque direction.

It is the last two modes that enable a discrete ratio gearbox to have the ability to shift up or down ratios instantly under load without torque interruption. Instantaneous transmissions are described in WO 2004/099654, WO 2005/005868, WO 2005/005869, WO 2005/024261 and WO 2005/026570, WO 2006/095140, WO 2006/123128, WO2006/123166, WO2007/132209, WO2008/062192, WO2008/096140, WO2008/145979, WO2009/068853, WO2010/046654, WO2010/046655, WO2010/046652, and WO2012/164237 the contents of which are incorporated by reference.

The instantaneous transmissions referred to above are designed primarily for vehicles including combustion engines where a large number of gear ratios are provided. Since a large number of gear ratios are provided the energy transferred to the selector assembly when engaging a new gear ratio is manageable because the speed differences between ratios are relatively small. Accordingly the instantaneous transmissions referred to above are not necessarily optimised for electric vehicles powered by an electric motor since electric vehicle transmissions tend to have fewer gear ratios and the electric motor has a much higher operating speed than a conventional combustion engine. Consequently the speed differences between gear ratios in an electric vehicle are relatively high, which means engagement forces applied to the selector assembly would be relatively high. This can cause damage to the selector assembly and reduce its useful lifespan.

Nevertheless, it is still desirable to have torque support during a gearshift in a transmission system for an electric vehicle comprising discrete ratios to prevent loss of power to the wheels during the gearshift, even if this can be achieved for some shift types only and not others. Furthermore, it is desirable to provide torque support using a relatively simple transmission layout and relatively simple selector assemblies in order to reduce control complexity, where possible. It with this background that the present invention seeks to provide an improved transmission system that is particularly suited for use with electric vehicles, though of course may be used in other contexts.

Accordingly, the invention seeks to mitigate at least one of the aforementioned problems, or at least to provide an alternative transmission system to existing transmission systems.

According to a first aspect of the invention there is provided a transmission system according to claim 1. Since the first selector assembly consists of a single engagement ring only, it is not able to drivingly engage the gear element mounted on the first input shaft in the second rotational direction. Furthermore, it is not able to drivingly engage gear element mounted on the first lay shaft in the first rotational direction. This is because the drive faces on the first side of the engagement ring all face towards the first rotational direction and the drive faces on the second side of the engagement ring all face towards the second rotational direction. Thus the first selector assembly has only the following operational modes with respect to each of its associated gear elements: lock the gear element for rotation with a respective shaft in one rotational direction only and not lock the gear element for rotation with the respective shaft in the opposite rotational direction; and neutral.

According to another aspect of the invention there is provided a transmission system.

The transmission system can include a first input shaft that is arranged to receive drive directly from a drive source.

The transmission system can include a second input shaft that is arranged to receive drive from the drive source via a drive interruption means, such as a friction clutch device.

The transmission system can include a first lay shaft.

A gear element can be rotatably mounted on the first input shaft. A gear element can be mounted on the first lay shaft.

A first selector assembly can be arranged to selectively lock the gear element rotatably mounted on the first input shaft for rotation with the first input shaft. The first selector assembly can be arranged to selectively lock the gear element mounted on the first lay shaft for rotation with the first input shaft.

The first selector assembly can comprise a single engagement ring. The engagement ring can include a first side having a first set of engagement elements. Each engagement element can have a drive face arranged to drivingly engage in a first rotational direction a first set of drive formations associated with the gear element rotatably mounted on the first input shaft. Each engagement element can have a non-driving face, such as a ramp, that is arranged to slip with respect to the first set of drive formations in a second rotational direction, thereby preventing driving engagement with the first set of drive formations.

The engagement ring can have a second side having a second set of engagement elements. Each engagement element can have a drive face arranged to drivingly engage in the second rotational direction a second set of drive formations associated with the gear element mounted on the first lay shaft. Each engagement element can have a non-driving face, such as a ramp, that is arranged to slip with respect to the second set of drive formations in the first rotational direction, thereby preventing driving engagement the second set of drive formations. The drive formations are associated with their respective gear elements in the sense that when the driving formations are engaged by the engagement ring torque is transferred between the engagement ring and the respective gear element. The driving formations can be mounted directly on their respective gear element or can be mounted onto an intermediate component such as a shaft or a mounting sleeve.

Each non-driving face can extend along a respective curved path. Each non-driving face can follow a curved path around a part of its respective side of the engagement ring, and typically a peripheral part of its respective side of the engagement ring. For example, the curved path can start at a position adjacent its respective drive face.

Each non-driving face can extend along a respective arcuate path from a position adjacent its respective drive face. Each non-driving face can extend along its respective arcuate path towards an adjacent one of the engagement elements on a respective side of the engagement ring. Each non-driving face can extend circumferentially along its respective arcuate path. Each non-driving face can follow an arcuate path around a peripheral part of its respective side of the engagement ring. The long sloping and curved arrangement of the non-driving faces prevents driving engagement of the driving formations from occurring. It also reduces the magnitude of slipping noise generated be the interaction of the non-driving faces with the driving formations, and the frictional forces experienced.

Each non-driving face can extend along its respective arcuate path from a position adjacent its respective drive face to a position adjacent the drive face of an adjacent one of the engagement elements on a respective side of the engagement ring. It is particularly helpful to minimise the magnitude of slipping noise generated and the frictional forces experienced by the interaction of the non-driving faces that extend circumferentially along arcuate paths and the driving formations. This is particularly useful where the relative speeds between gear elements are high, such as in electric vehicle transmissions.

The number of engagement elements on each side of the engagement ring can be less than or equal to four, less than or equal to three, or less than or equal to two. Low numbers of engagement elements are particularly suited to electric vehicle applications that have relatively few gear ratios as the speed differences between gear ratios are high. Having a small number of engagement elements increases the size of the "engagement windows" between engagement elements, which makes engagement easier, and reduces the frequency of slipping engagements between the engagement elements and the drive formations. This reduces the magnitude of the slipping noise generated. This is particularly useful where the relative speeds between gear elements are high such as in electric vehicle transmissions. It also ensures that the non-drive faces can have a larger arcuate extent, which reduces the rate of separation of the between the engagement ring and the drive formations when slipping occurs, providing more gentle slipping.

In preferred embodiments, the arcuate extent of each non-driving face is in the range 90° to 360°. This is particularly helpful to minimise the magnitude of slipping noise generated and the frictional forces experienced by the interaction of the non-driving faces that extend circumferentially along arcuate paths and the driving formations. This is particularly useful where the relative speeds between gear elements are high, such as in electric vehicle transmissions. The measurement can be taken with reference to a central axis of the engagement ring. For embodiments having four engagement elements per side of the engagement ring the arcuate extent of each non-driving face is typically around 90°. For embodiments having three engagement elements per side of the engagement ring the arcuate extent of each non-driving face can be in the range 90° to 120°, and is typically in the range 100° to 120°. For embodiments having two engagement elements per side of the engagement ring the arcuate extent of each non-driving face can be in the range 90° to 180°, and is typically in the range 150° to 180°. The number of engagement elements on the first side of the engagement ring can equal the number of engagement elements on the second side of the engagement ring.

In some embodiments only a single engagement element is provided on each side of the engagement ring. This maximises the size of the engagement window and provides the largest arcuate extent of each non-driving face. For embodiments having one engagement element per side of the engagement ring the arcuate extent of each non-driving face can be in the range 90° to 360°, can be in the range 180° to 360°, can be in the range 270° to 360°, and is typically in the range 300° to 360°.

Each non-driving face can be substantially planar along the arcuate path. This helps to provide a smooth slipping arrangement.

Each drive face can be planar.

Each drive face can be arranged radially from the centre of the engagement ring. That is, the plane of each drive face is aligned with a respective radius of the engagement ring. This helps to ensure that drive faces face in a single rotational direction.

The engagement ring can include internal splines. The internal splines can be arranged to mate with external splines formed on the first input shaft or with external splines formed on an intermediate component, such as a sleeve member, located between the engagement ring and the first input shaft. Preferably the transmission system includes a sleeve member including internal splines for a splined connection with the first input shaft. The sleeve member can include external splines for a splined connection with the internal splines of the engagement ring. This provides a very robust connection between the engagement ring and the first input shaft. The splined arrangement enables the engagement ring to move axially along input shaft while rotationally locking the engagement ring for rotation with the first input shaft. This differs from the mounting arrangement of instantaneous type selector assemblies, which have a more complicated mounting arrangement since it can be necessary to accommodate movement of two engagement rings.

The transmission system can include an actuator mechanism for controlling axial movement of the engagement ring. The actuator mechanism can include a shift fork engaged with the engagement ring. The actuator mechanism can include a single shift drum for controlling movement of the shift fork and engagement ring. Only a single shift drum is required for the first selector assembly because movement of the engagement ring can be reversible. Thus the transmission system can provide torque support during at least some shift types, with a relatively simple transmission layout and a relatively simple actuator mechanism.

The actuator mechanism can include a spring cradle. This helps to mitigate against shocks, for example during a slipping condition, where some axial movement of the engagement ring may occur.

The transmission system may consist of a 2-speed transmission system. That is, the transmission system can include $1^{st}$ and $2^{nd}$ gears only.

A gear element can be rotatably mounted on the second input shaft.

The transmission system can include a second selector assembly for selectively locking the gear element mounted on the second input shaft for rotation with the second input shaft.

The second selector assembly can be a conventional selector assembly such as a synchromesh or dog clutch type assembly.

The second selector assembly can be arranged to selectively lock the gear element rotatably mounted on the first input shaft for rotation with the second input shaft.

The transmission system can include a second lay shaft.

The transmission system can include an output shaft.

The transmission system can include a gear element mounted on the output shaft, which meshes with the gear element mounted on the first lay shaft.

$1^{st}$ gear in the transmission can include the gear element mounted on the first lay shaft and the gear element mounted on the output shaft, which meshes with the gear element mounted on the first lay shaft.

The transmission system can include a gear element mounted on the output shaft, which meshes with the gear element rotatably mounted on the first input shaft.

$2^{nd}$ gear in the transmission can include the gear element rotatably mounted on the first input shaft and the gear element mounted on output shaft, which meshes with the gear element rotatably mounted on the first input shaft.

The transmission system can include a second lay shaft.

The transmission system can include a gear element mounted on the second lay shaft, which meshes with the gear element rotatably mounted on the second input shaft.

The transmission system can include a gear element mounted on the second lay shaft, which meshes with the gear element mounted on the first lay shaft.

The transmission system can include a torque pathway between the second input shaft and the gear element rotatably mounted on the first input shaft. This can be provided by the second selector assembly.

One of the first and second input shafts can be tubular and can house at least part of the other of the first and second input shafts. For example, the second input shaft can be tubular and can house at least a part of the first input shaft. The first input shaft can be coaxial with the second input shaft. This provides a very compact arrangement.

The transmission system can include a control system for controlling operation of the transmission system.

The transmission system can be arranged such that when driving in $1^{st}$ gear torque can be routed from the second input shaft to the output shaft via the second lay shaft.

The transmission system can be arranged such that when in overrun in 1st gear, torque can be routed from an output shaft to the second input shaft via the 1st gear train.

The transmission system can be arranged such that when driving in 2nd gear torque can be routed from the second input shaft to the output shaft via the gear element rotatably mounted on the first input shaft.

The transmission system can be arranged such that when in overrun in $2^{nd}$ gear torque can be routed from the output shaft to the second input shaft via the gear element rotatably mounted on the first input shaft.

The transmission system can be arranged to supply torque continually to the output shaft during a power on upshift, for example from $1^{st}$ gear to $2^{nd}$ gear.

The transmission system can be arranged to supply torque continually to the output shaft during a power on downshift, for example from $2^{nd}$ gear to 1st gear.

The transmission system can be arranged to supply torque to at least one of the first and second input shafts during a power off upshift, for example from $1^{st}$ gear to $2^{nd}$ gear. This enables the torque to be used in a drivetrain, for example to recharge a battery in an electric vehicle. At least one of the input shafts can receive torque throughout the shift.

The transmission system can be arranged to supply torque to at least one of the first and second input shafts during a power off downshift, for example from $2^{nd}$ gear to $1^{st}$ gear. This enables the torque to be used in a drivetrain, for example to recharge a battery in an electric vehicle. At least one of the input shafts can receive torque throughout the shift.

The transmission system can be arranged to switch torque flow, during a power on upshift, from a first torque path that can include the second input shaft, the second lay shaft and the gear element mounted on the first lay shaft, to a second torque path that can include the first input shaft and the gear element mounted on the first lay shaft. The transmission system can be arranged to switch torque flow, during a power on upshift, from the second torque path to a third torque path that can include the second input shaft and the gear element rotatably mounted on the first input shaft.

The transmission system can be arranged to switch torque flow, during a power on downshift, from a first torque path that can include the second input shaft and the gear element rotatably mounted on the first input shaft, to a second torque path that can include the first input shaft and the gear element mounted on the first lay shaft. The transmission system can be arranged to switch torque flow, during a power on downshift, from the second torque path to a third torque path that can include the second input shaft, the second lay shaft and the gear element rotatably mounted on the first lay shaft.

The transmission system can be arranged to switch torque flow, during a power off upshift, from a first torque path that can include the second input shaft, the second lay shaft and the gear element mounted on the first lay shaft, to a second torque path that can include the first input shaft and the gear element mounted on the first input shaft. The transmission system can be arranged to switch torque flow, during a power off upshift, from the second torque path to a third torque path that can include the second input shaft and the gear element rotatably mounted on the first input shaft.

The transmission system can be arranged to switch torque flow, during a power off downshift, from a first torque path that can include the second input shaft and the gear element rotatably mounted on the first input shaft, to a second torque path that can include the first input shaft and the gear element mounted on the first input shaft. The transmission system can be arranged to switch torque flow, during a power off downshift, from the second torque path to a third torque path that can include the second input shaft, the second lay shaft and the gear element rotatably mounted on the first lay shaft.

The transmission system can be arranged to operate at least one of the first selector assembly, the second selector assembly and a clutch to switch between the first, second and/or third torque paths for at least one, and preferably each, of power on upshifts, power on downshifts, power off upshifts and power off downshifts.

According to another aspect of the invention there is provided a drive train including a transmission system according to any configuration described herein. The drive train can include at least one of: a drive source and a slippable drive such as friction clutch device. The frication clutch device can be a wet friction clutch or a dry friction clutch.

According to another aspect of the invention there is provided an electric vehicle including a drive train according to any configuration described herein. The drive source comprises an electric motor.

The invention has many advantages, which include:

- The transmission system is significantly less complex and easier to control than a DCT type transmission system, and is less complex and easier to control than an instantaneous type transmission system.
- The capacity of the synchronisers is small because the layout of the transmission means that the size of the inertia that has to be synchronised is relatively small. In DCTs the capacity of the synchronisers is significantly higher.
- Only one type of synchroniser is required, which reduces manufacturing costs. For DCTs it is often required to have many different types of synchronisers in different parts of the transmission.
- The transmission layout and shift strategies employed enables torque support to be provide during at least some gearshifts.
- The transmission layout is very compact. It is also versatile in the sense that it can be used front wheel drive vehicles, rear wheel drive vehicles and all wheel drive vehicles.
- The layout uses many regular transmission components so existing production lines can easily be adapted to manufacture this transmission layout.
- The layout and shift strategies enables the torque in the transmission to be controlled during a gearshift in a manner that eliminates engagement torque spikes so it is not necessary for any of the gears to include dampers.

Embodiments of the present invention will now be described, by way of example only, with reference to the accompanying drawings in which like references indicate equivalent features, wherein:

FIG. 1a is a schematic of a 2 speed transmission system, suitable for use in a vehicle, such as a car, having an electric motor as a drive source, in accordance with an embodiment to the invention;

FIG. 2 is an isometric view of a gear selector ring and an actuator mechanism used in the 2 speed transmission system of FIG. 1a;

Figure 2:
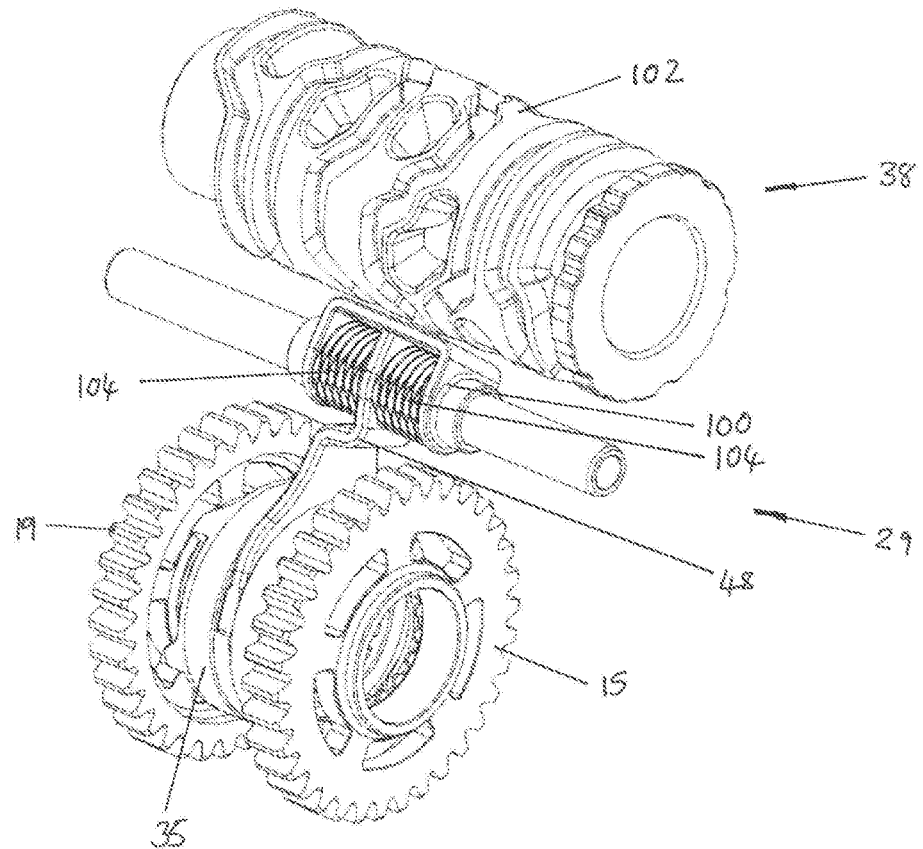
Figure 3A:
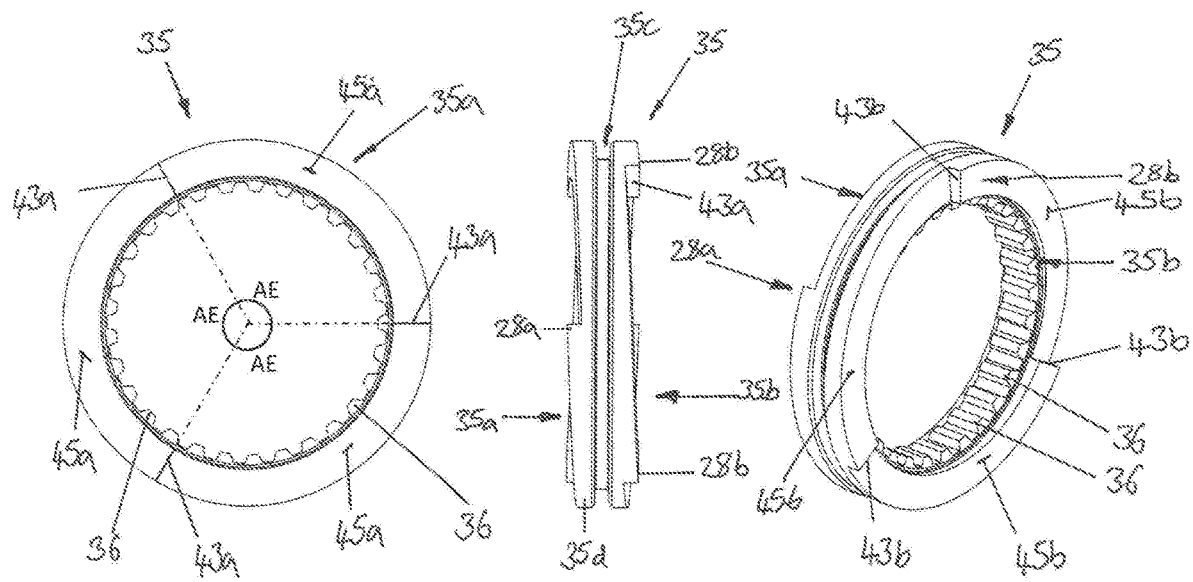
Figure 3B:
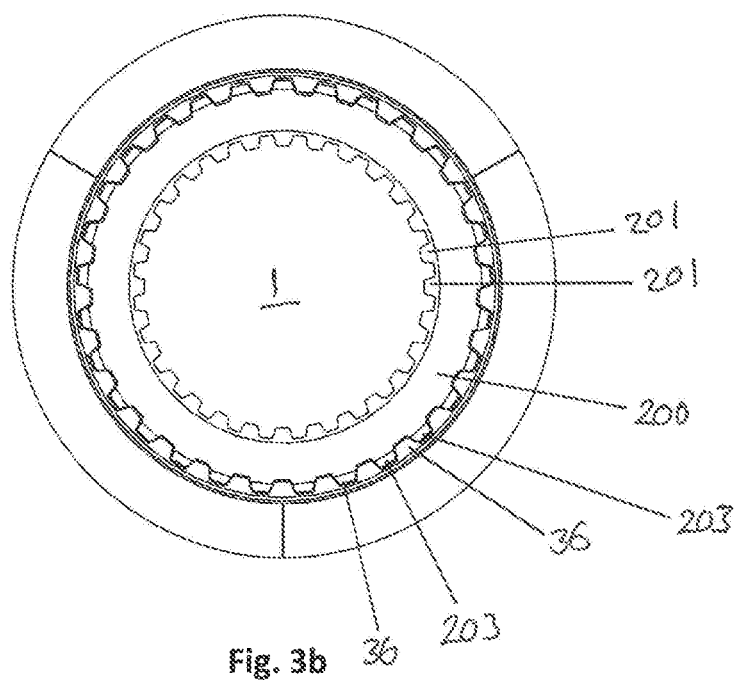
Figure 4A:
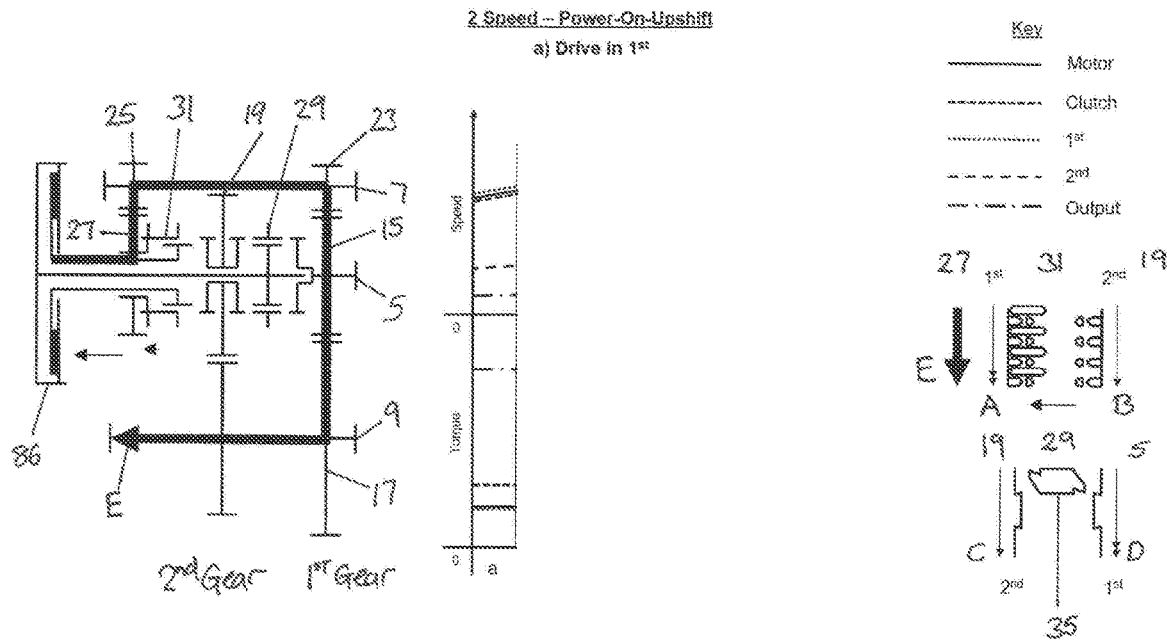
Figure 4B:
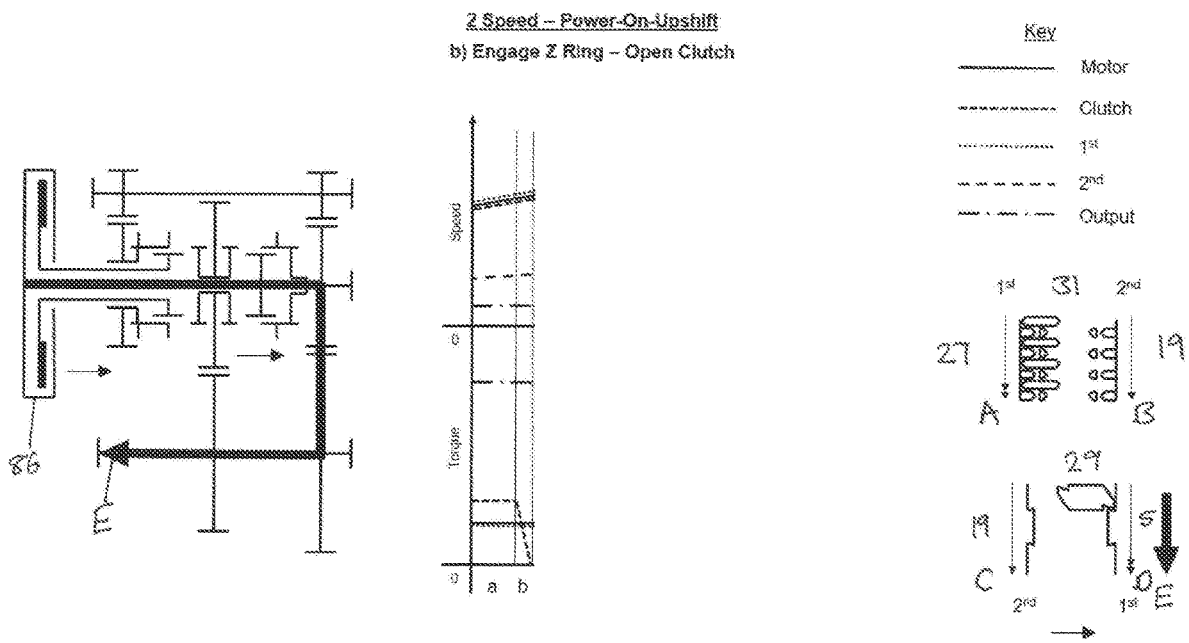
Figure 4C:
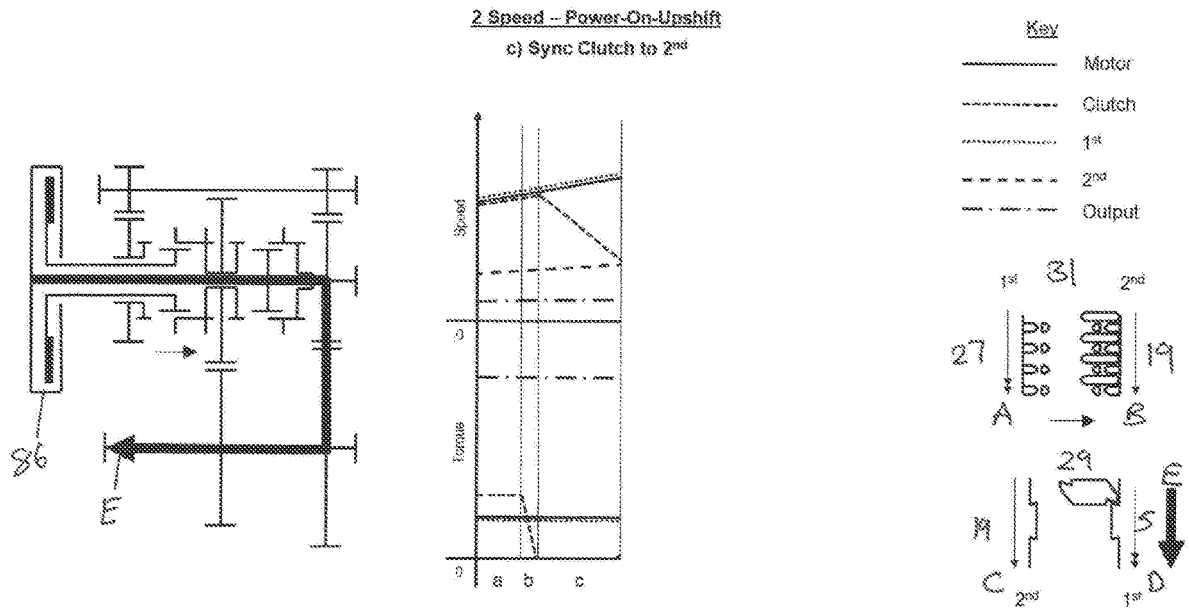
Figure 4D:
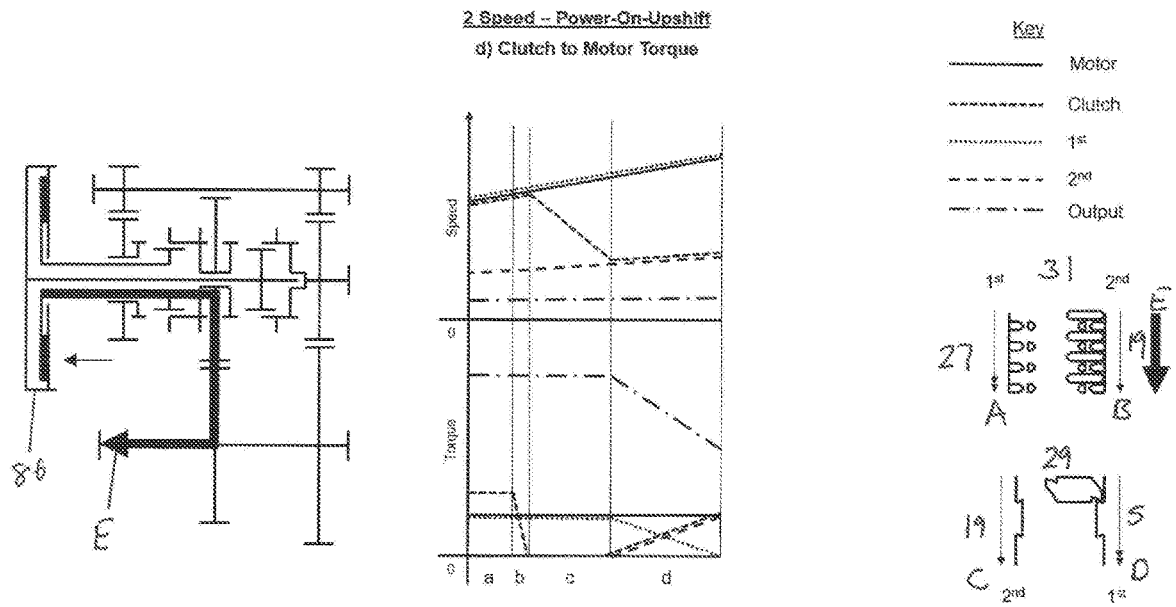
Figure 4E:
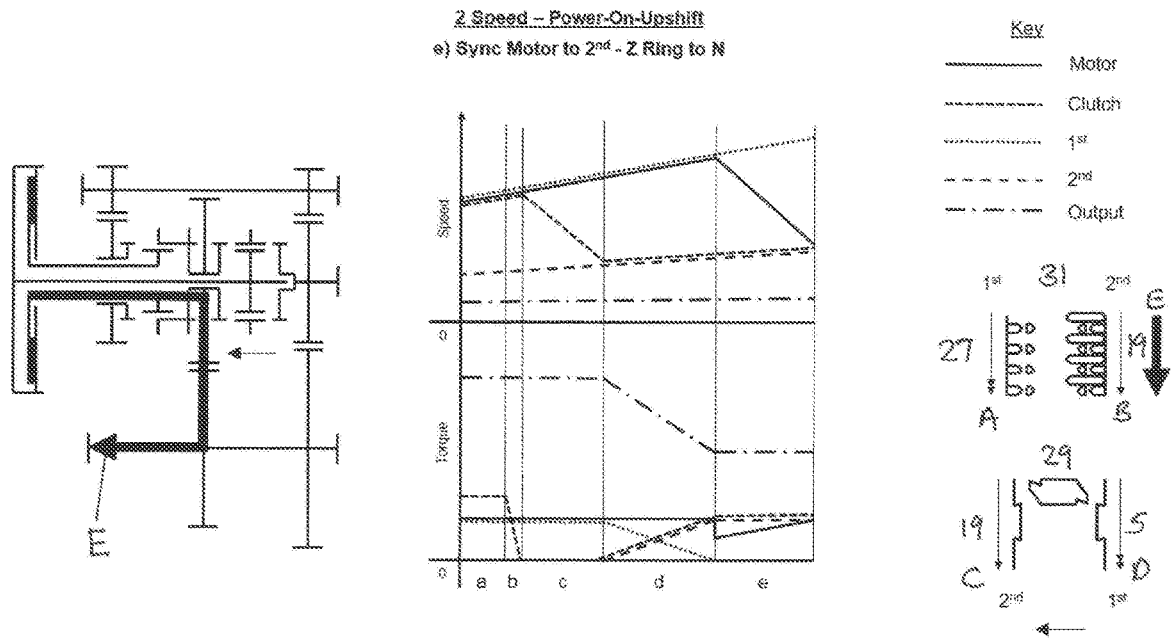
Figure 4F:
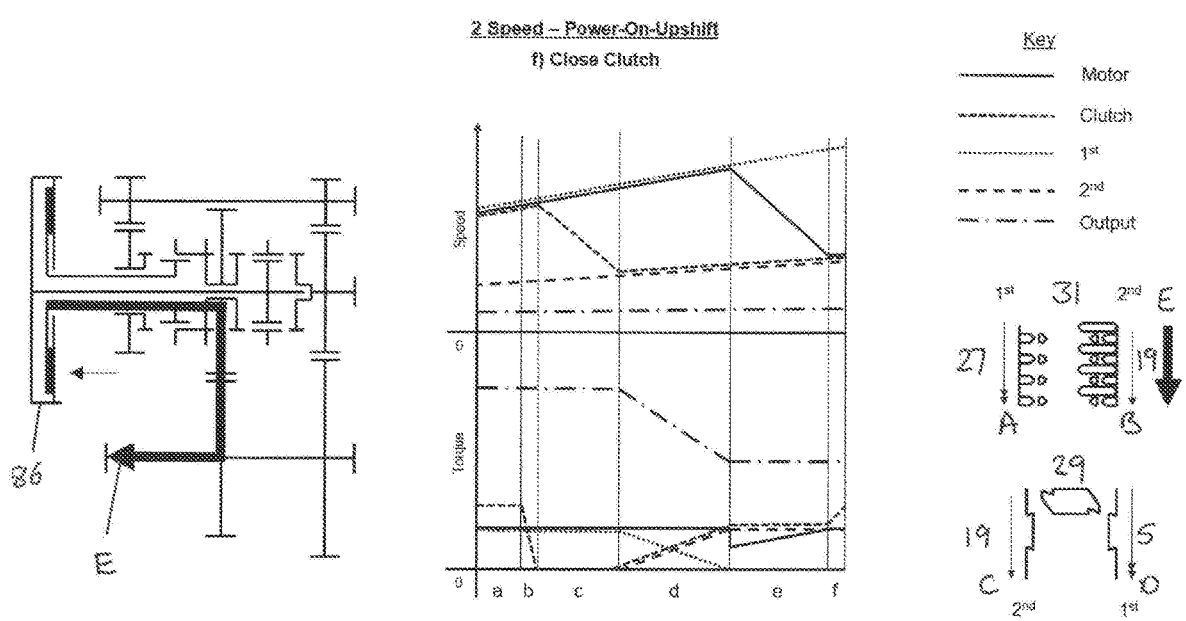
Figure 4G:
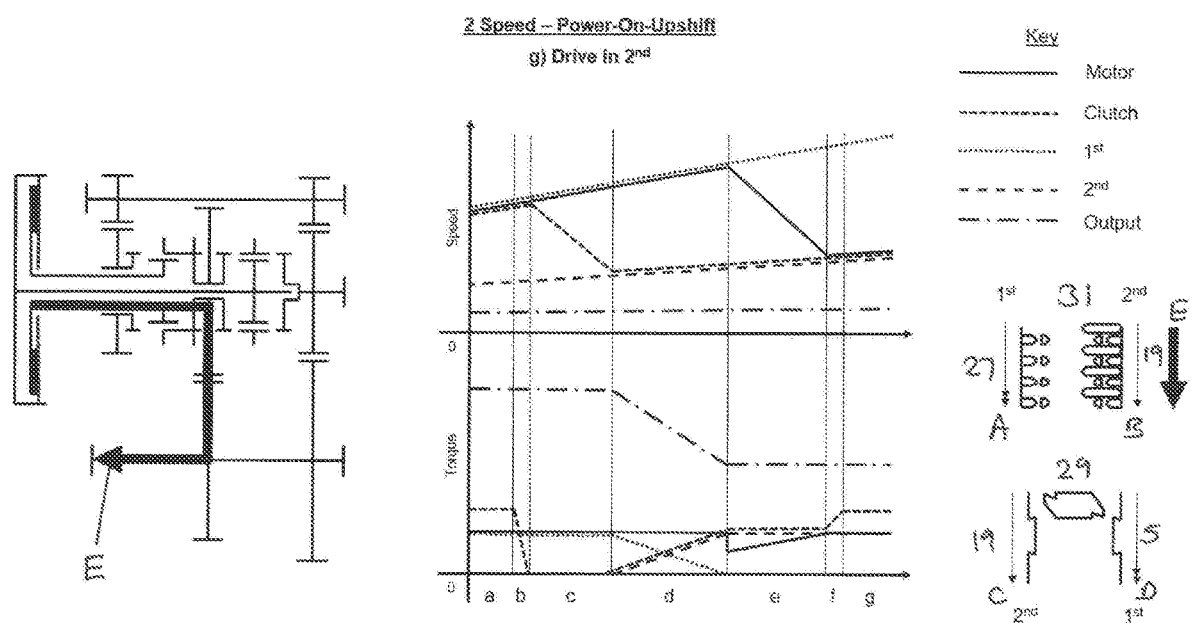
Figure 5:
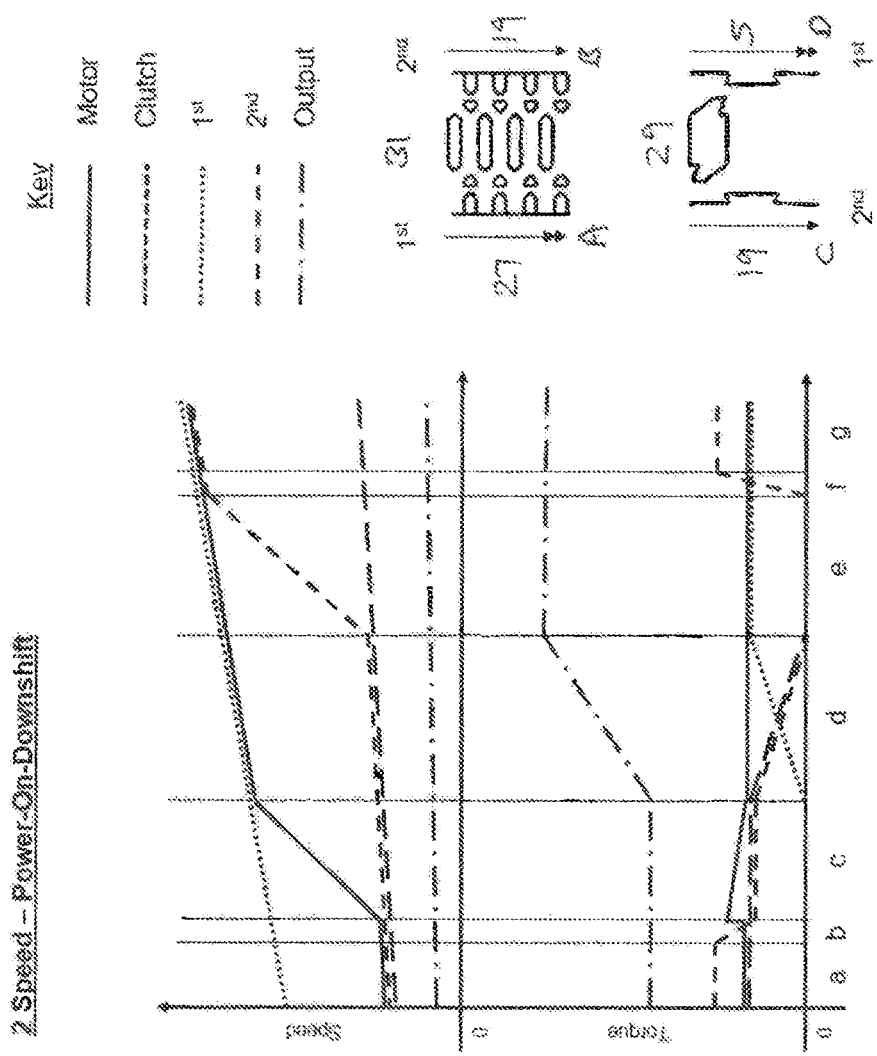
Figure 5:
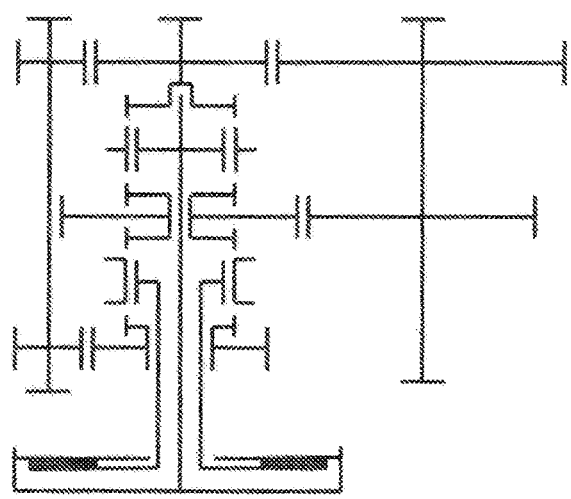
Figure 5A:
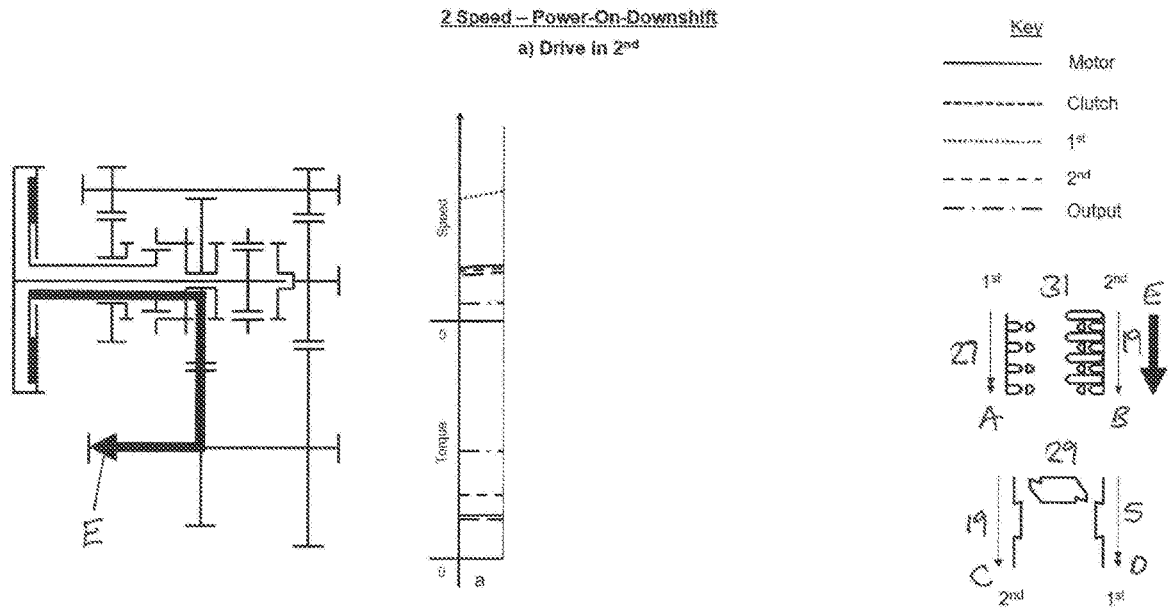
Figure 5B:
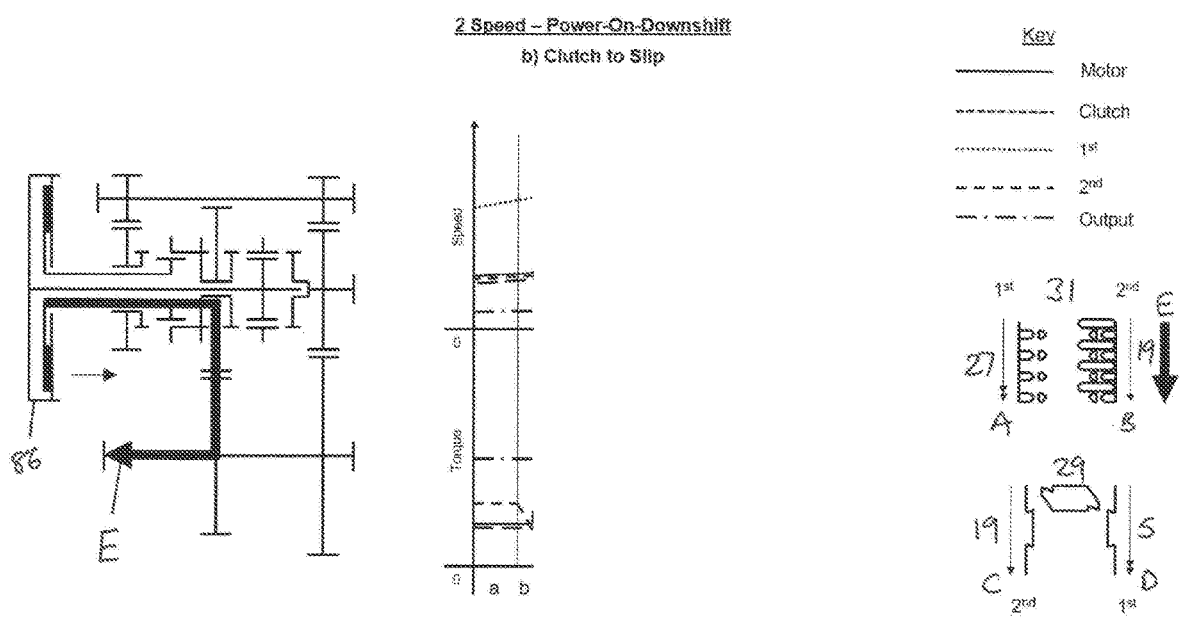
Figure 5C:
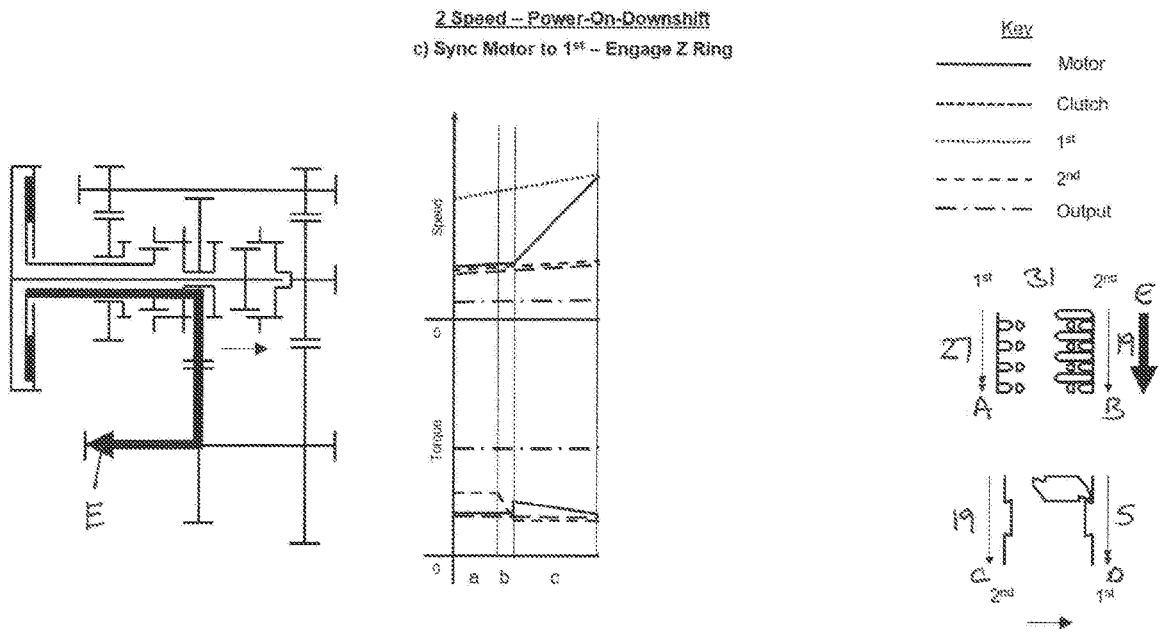
Figure 5D:
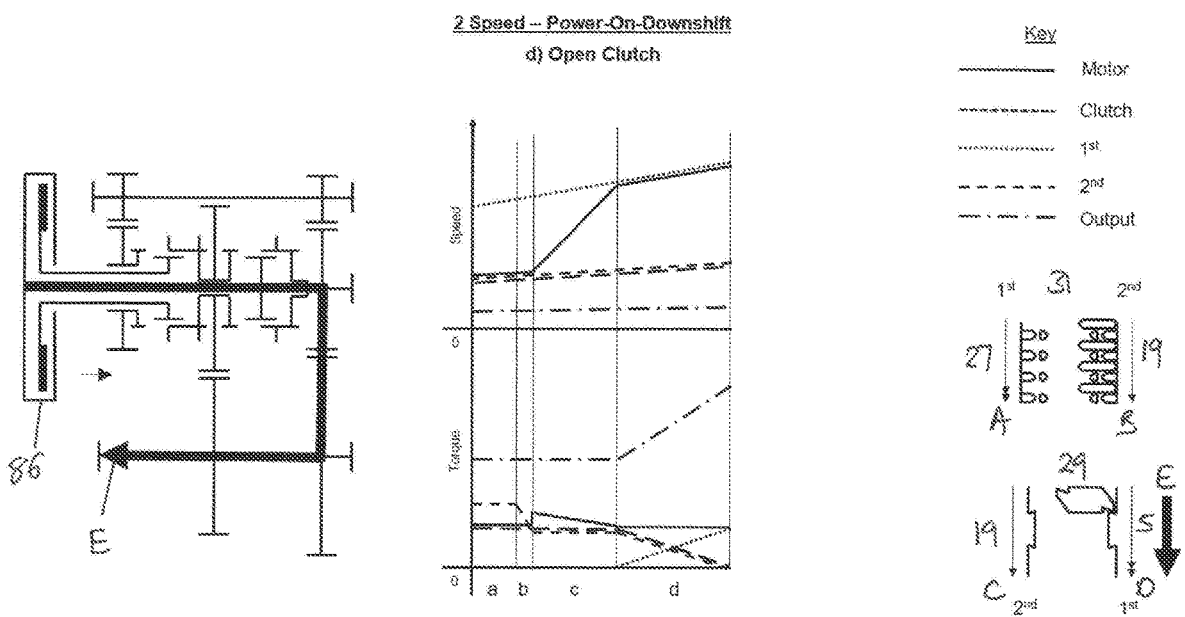
Figure 5E:
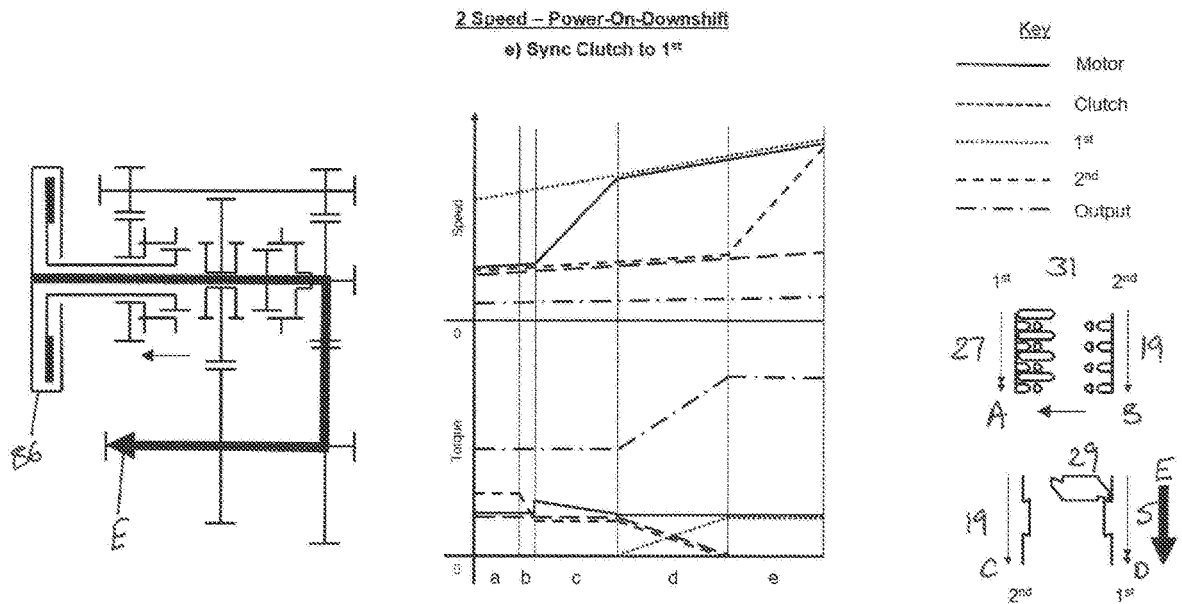
Figure 5F:
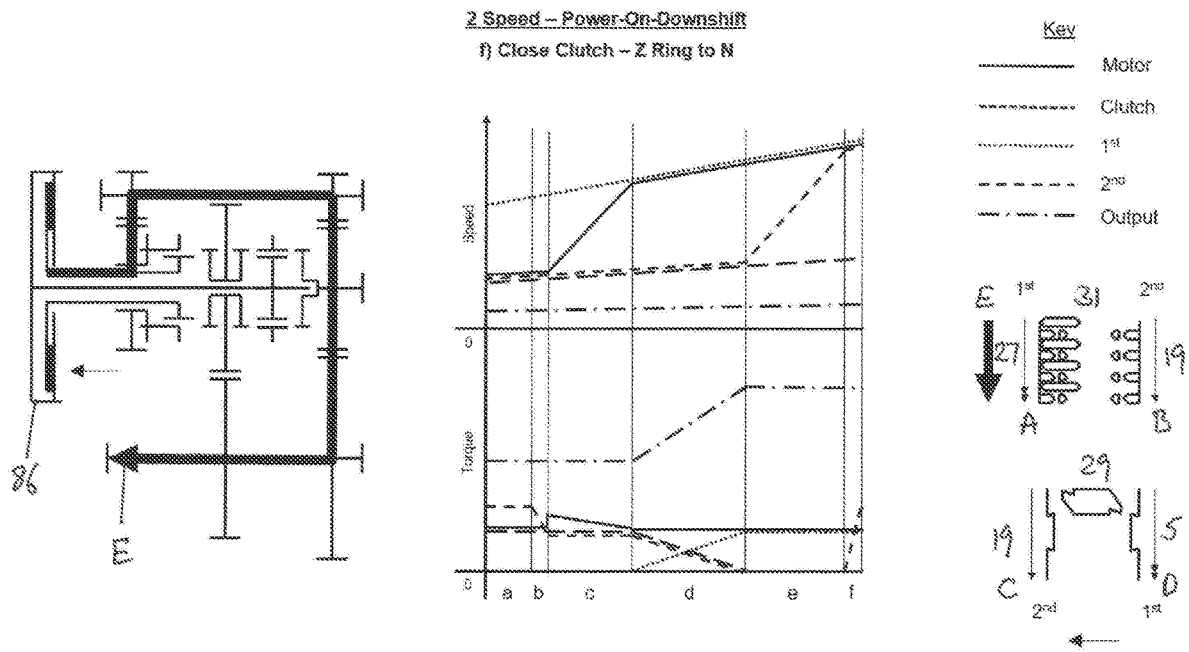
Figure 5G:
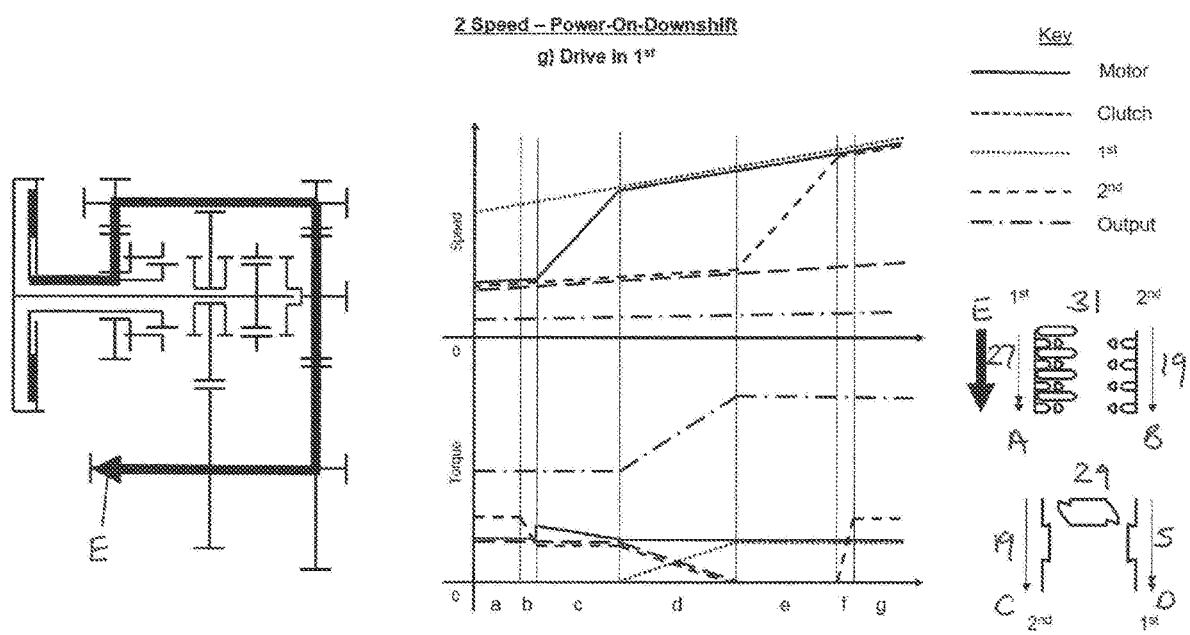
Figure 6:
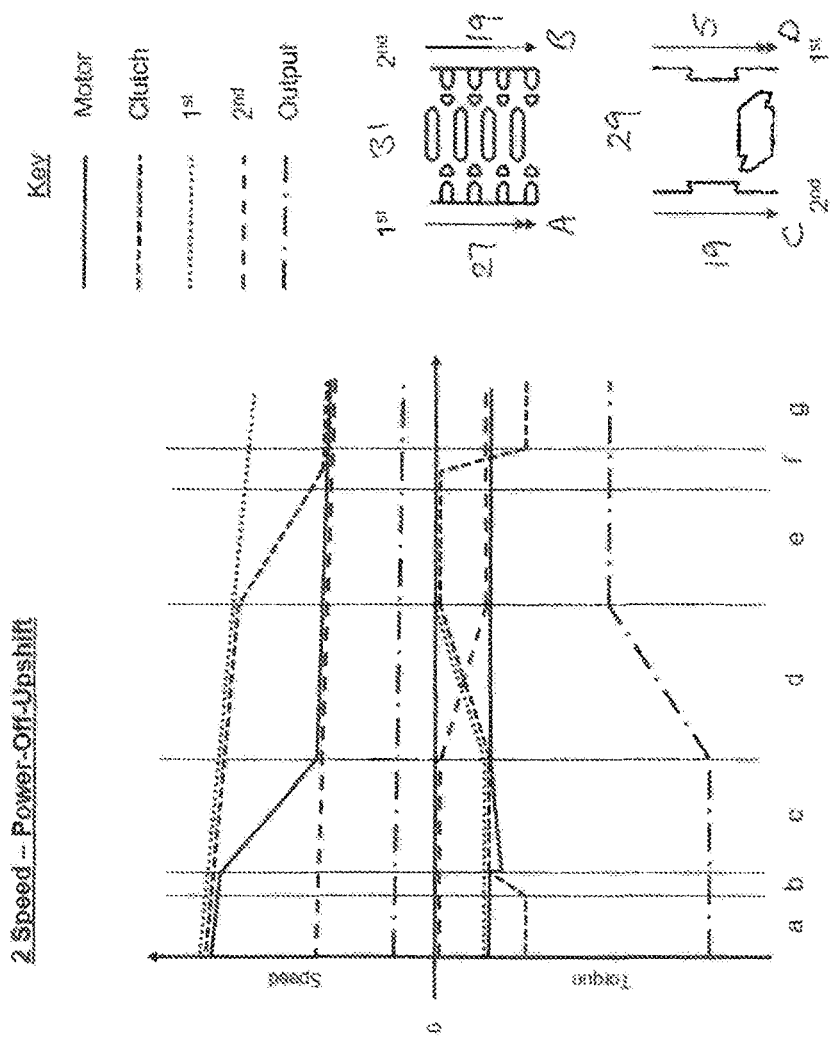
Figure 6:
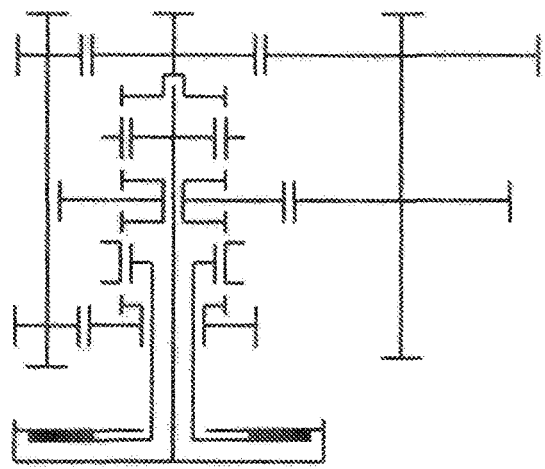
Figure 6A:
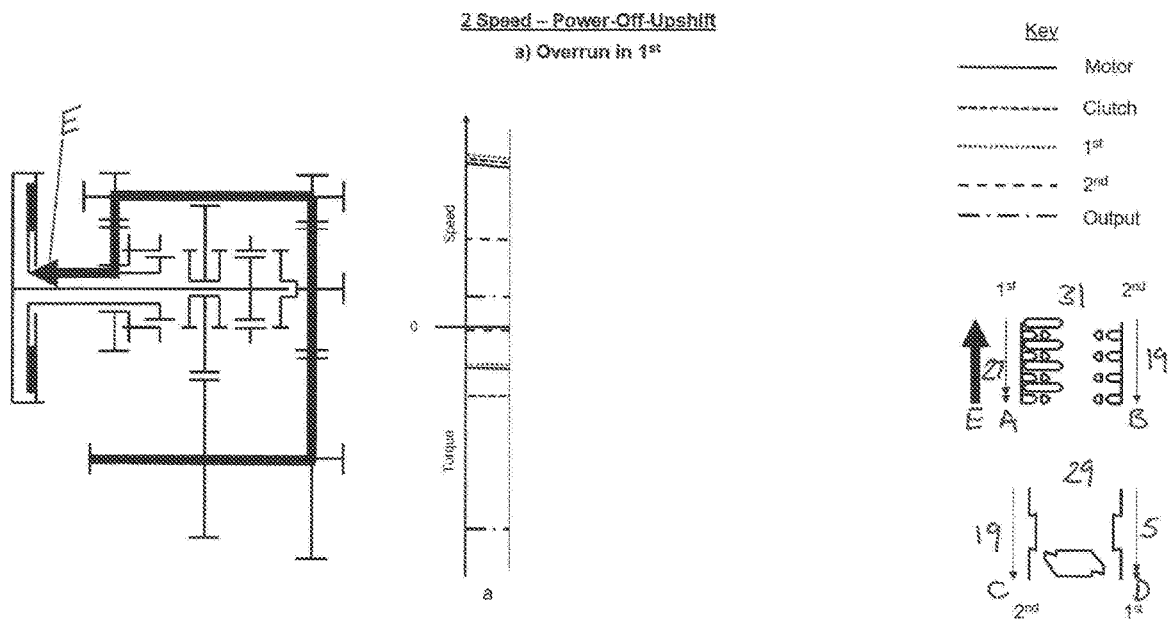
Figure 6B:
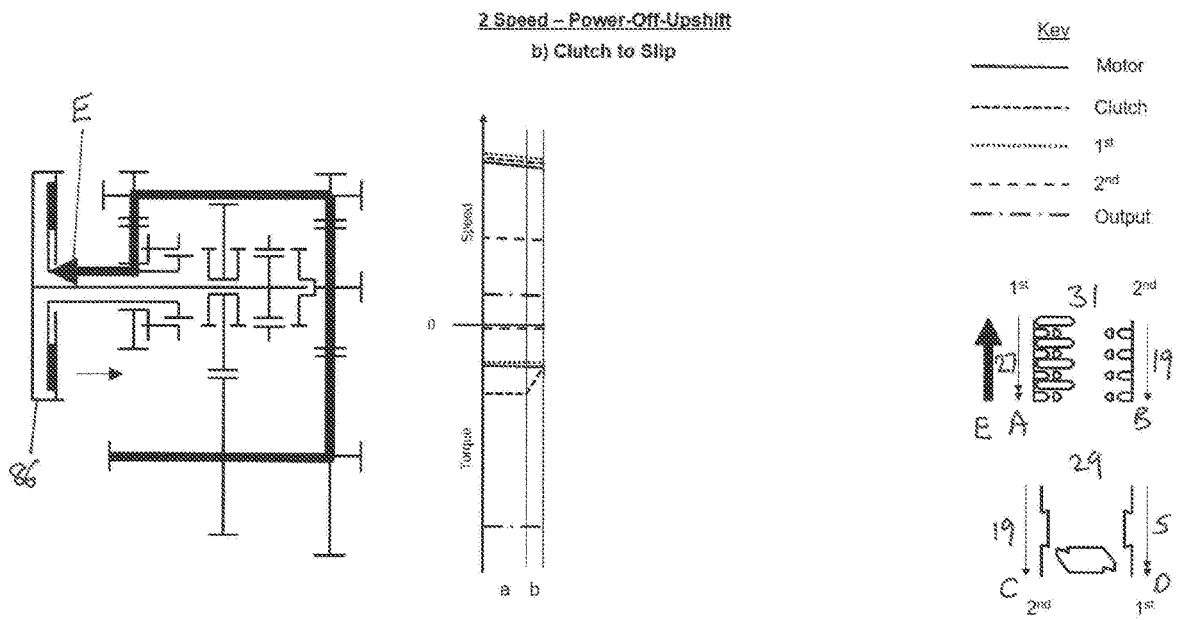
Figure 6C:
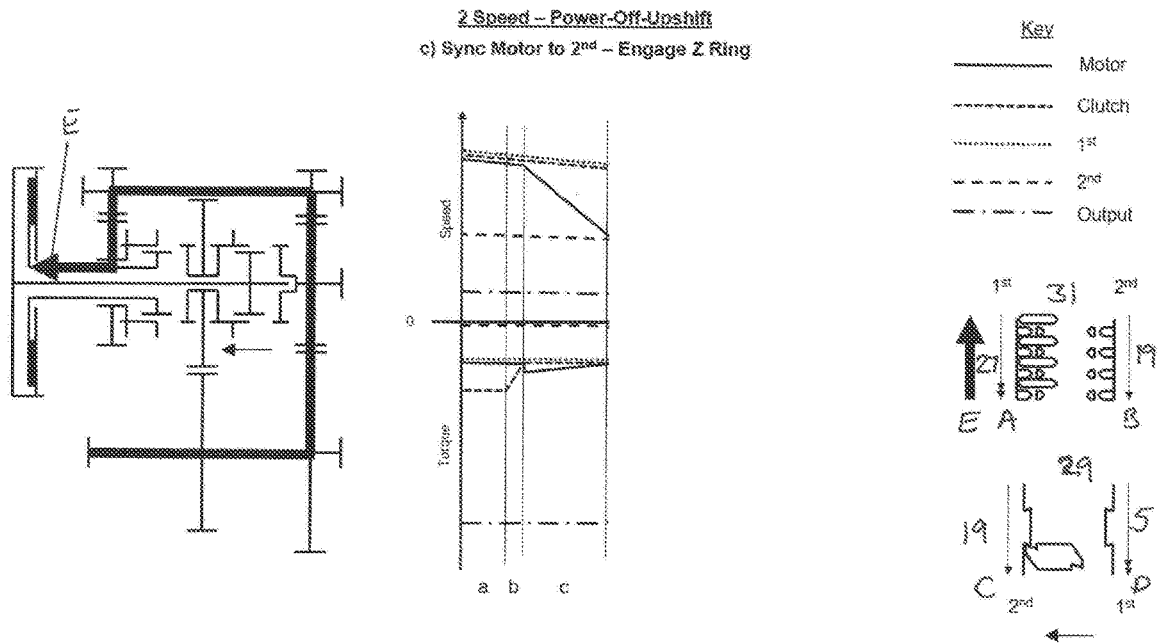
Figure 6D:
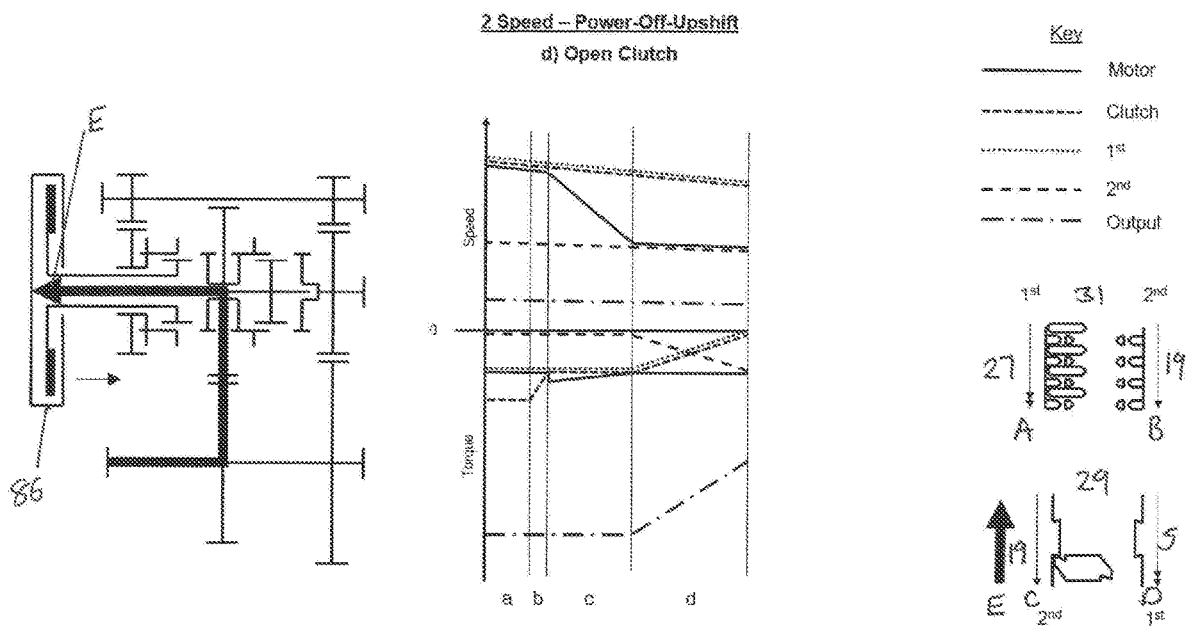
Figure 6E:
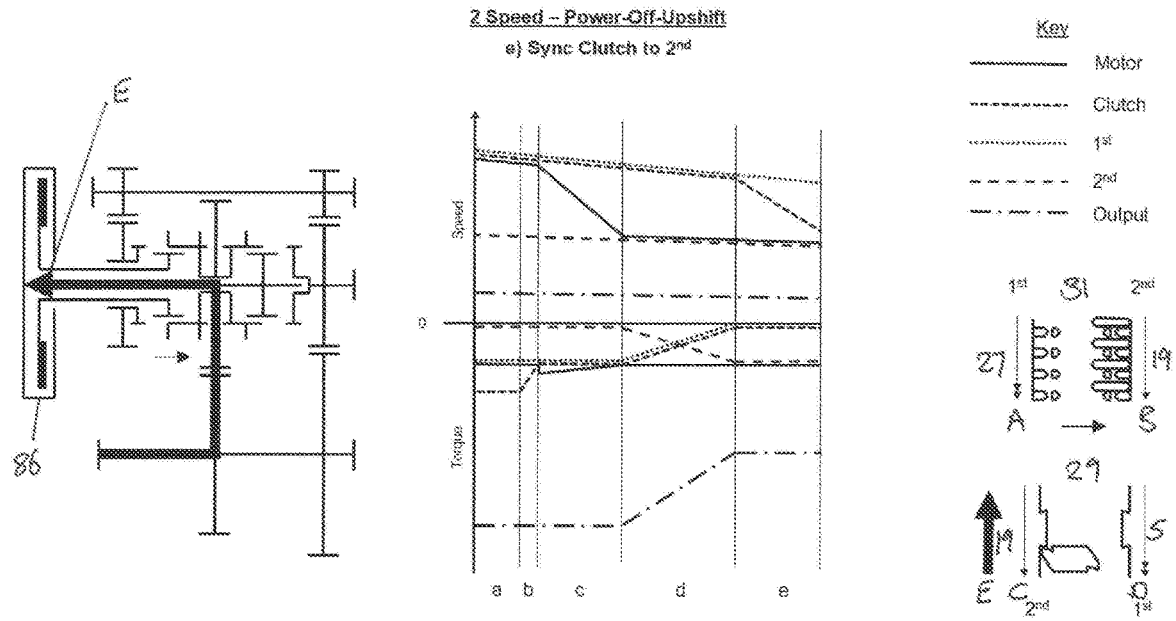
Figure 6F:
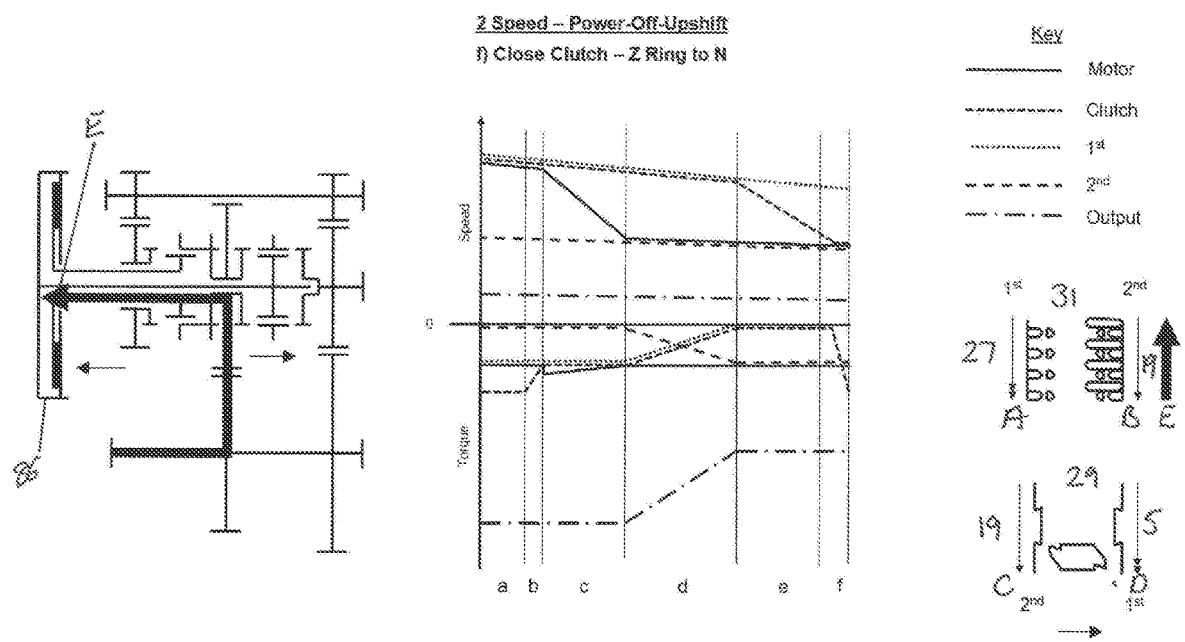
Figure 6G:
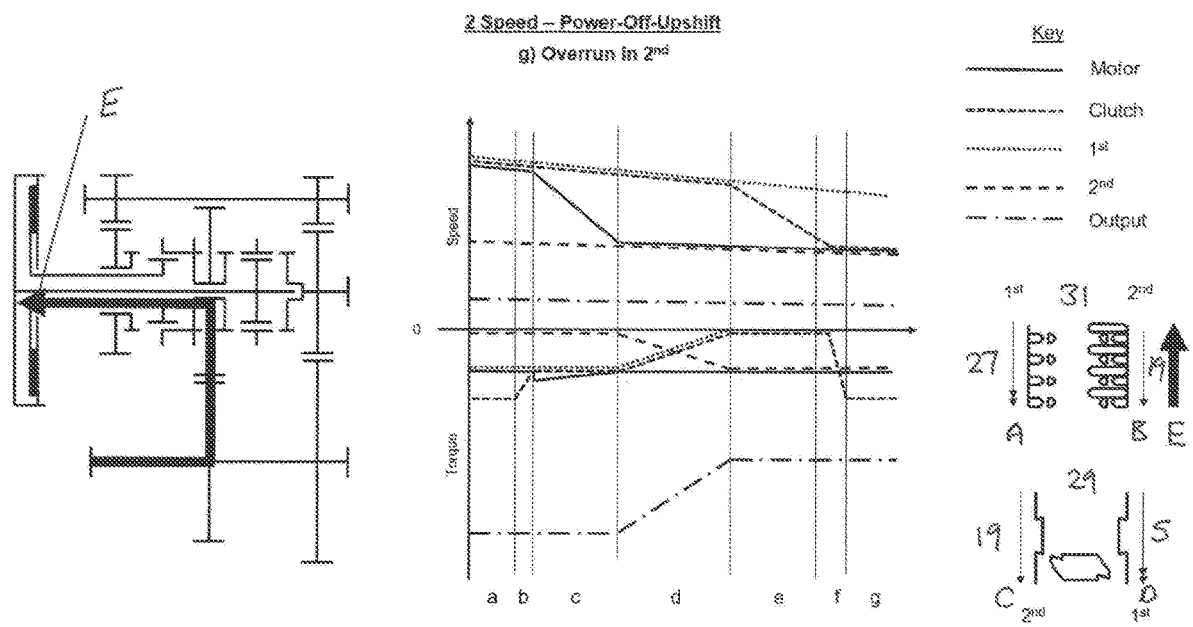
Figure 7:
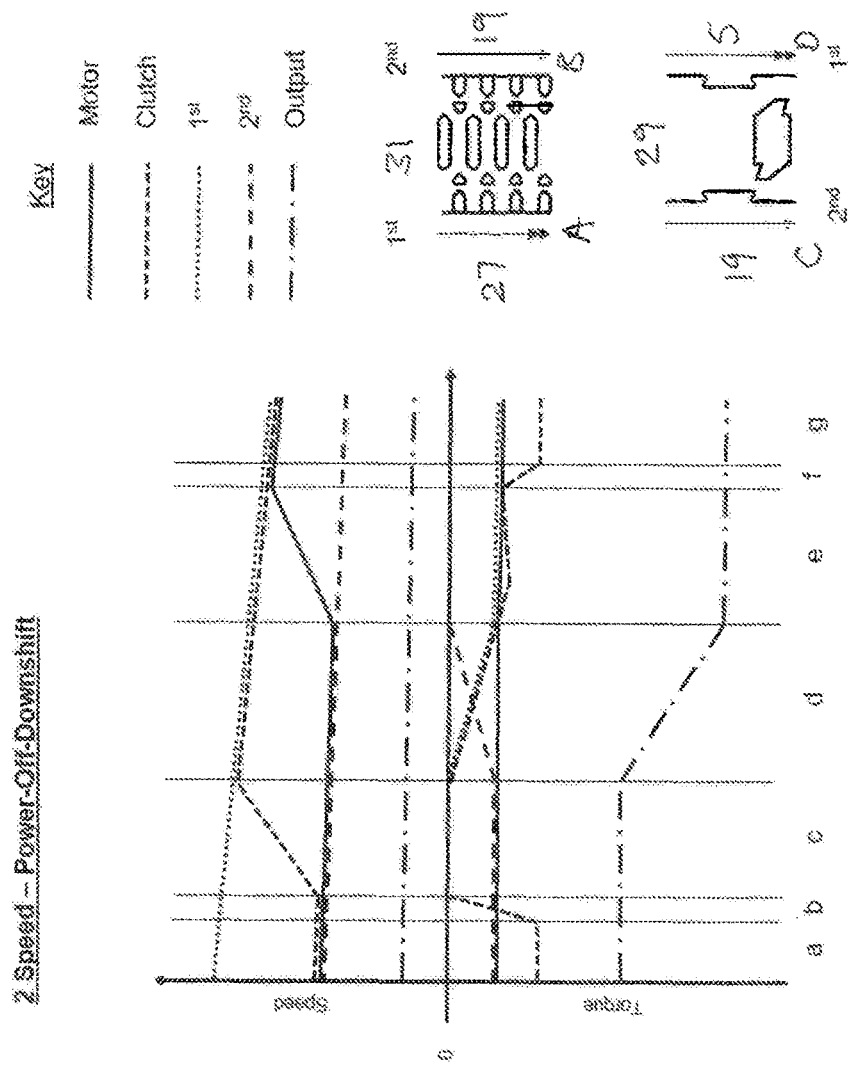
Figure 7:
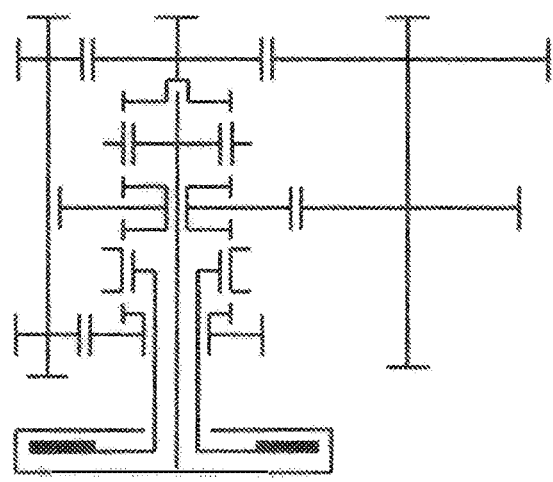
Figure 7A:
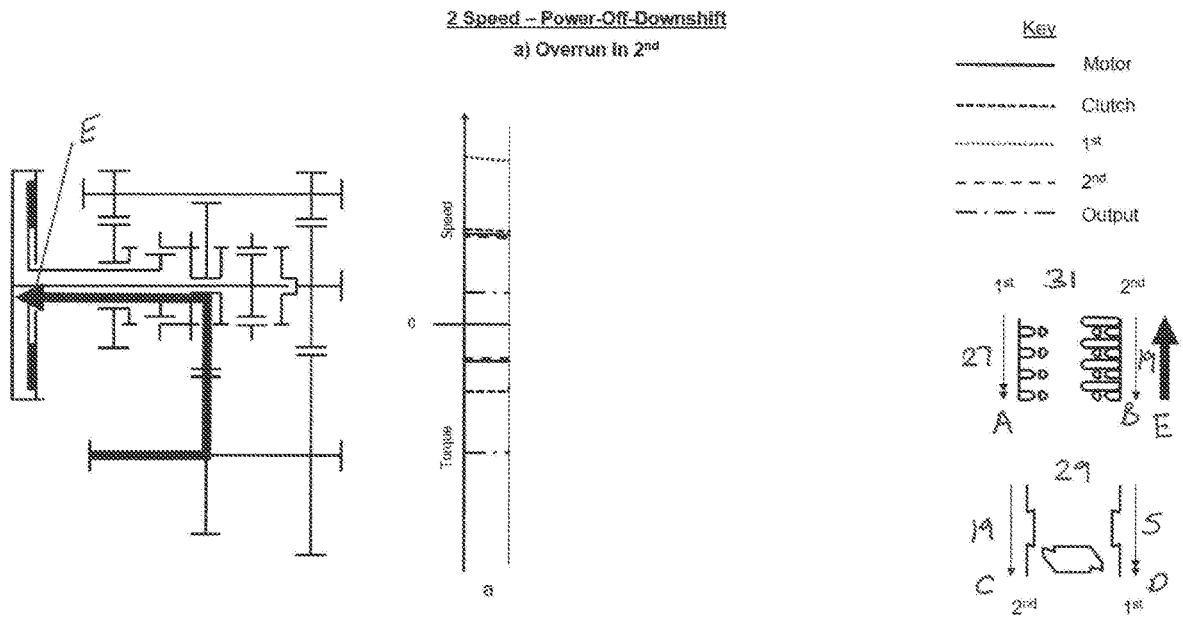
Figure 7B:
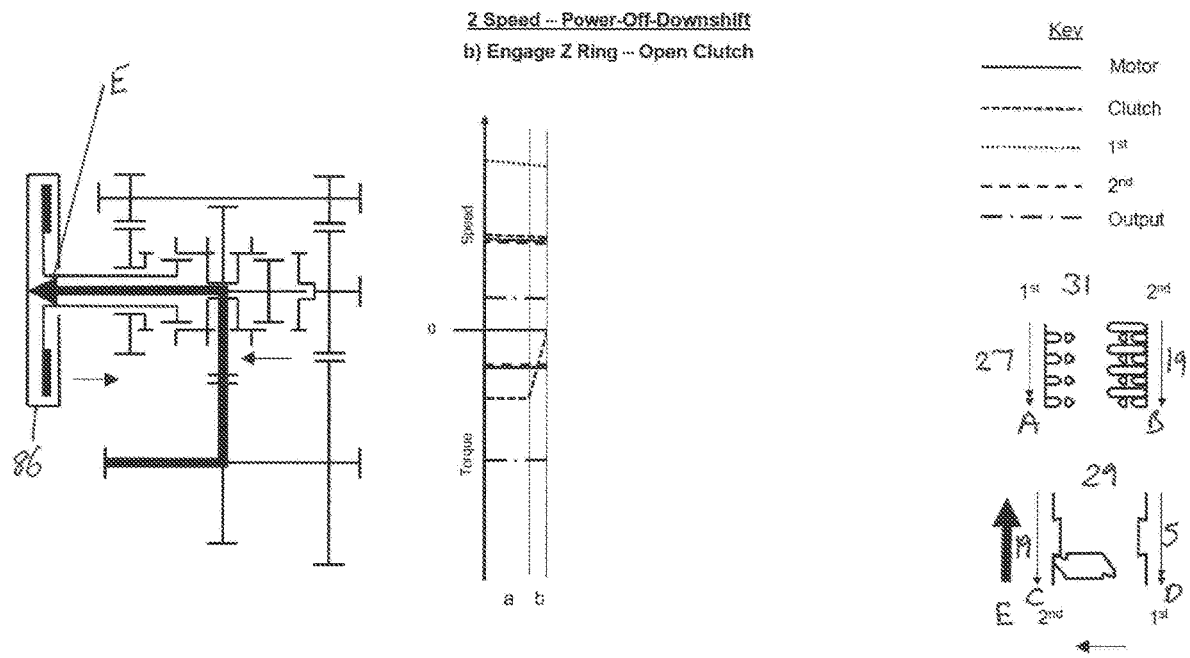
Figure 7C:
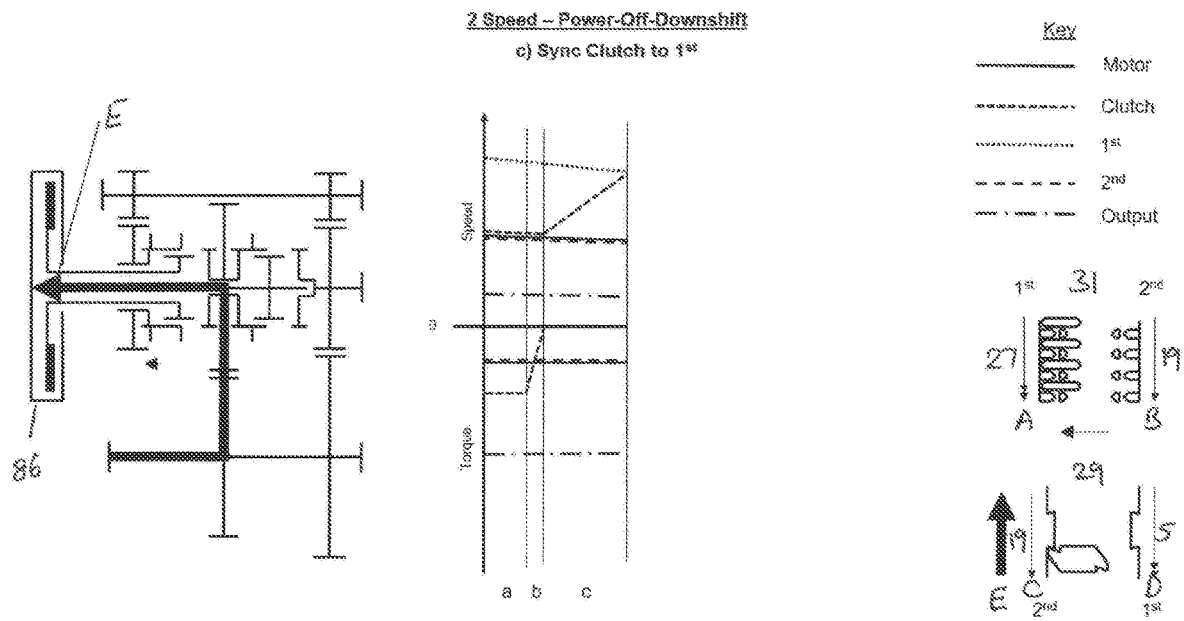
Figure 7D:
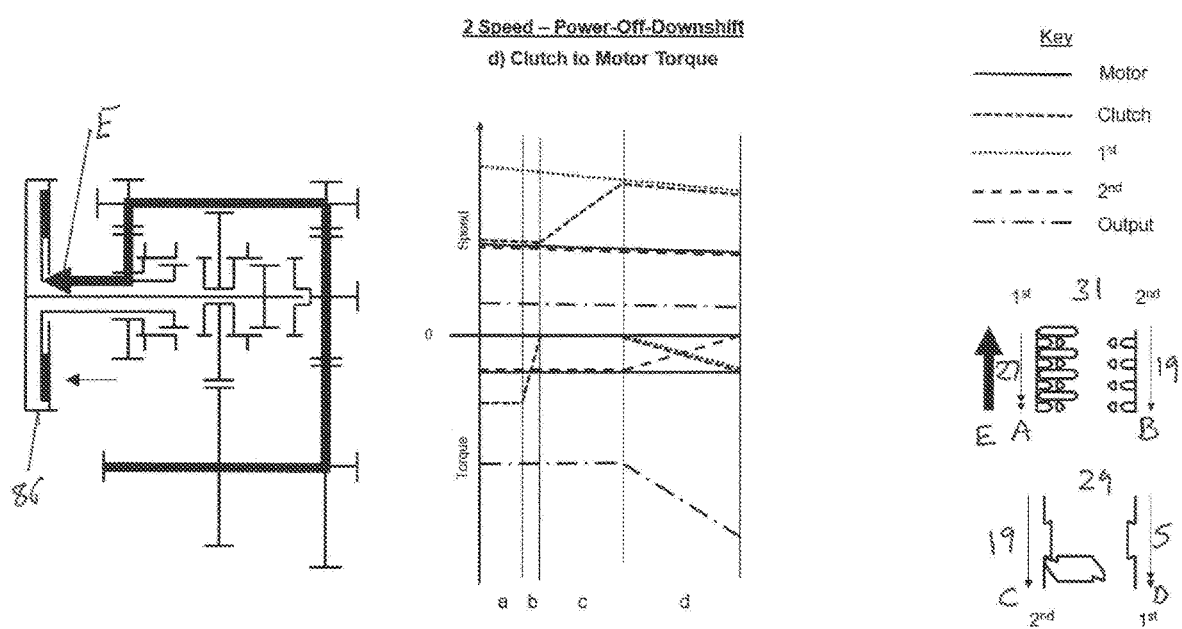
Figure 7E:
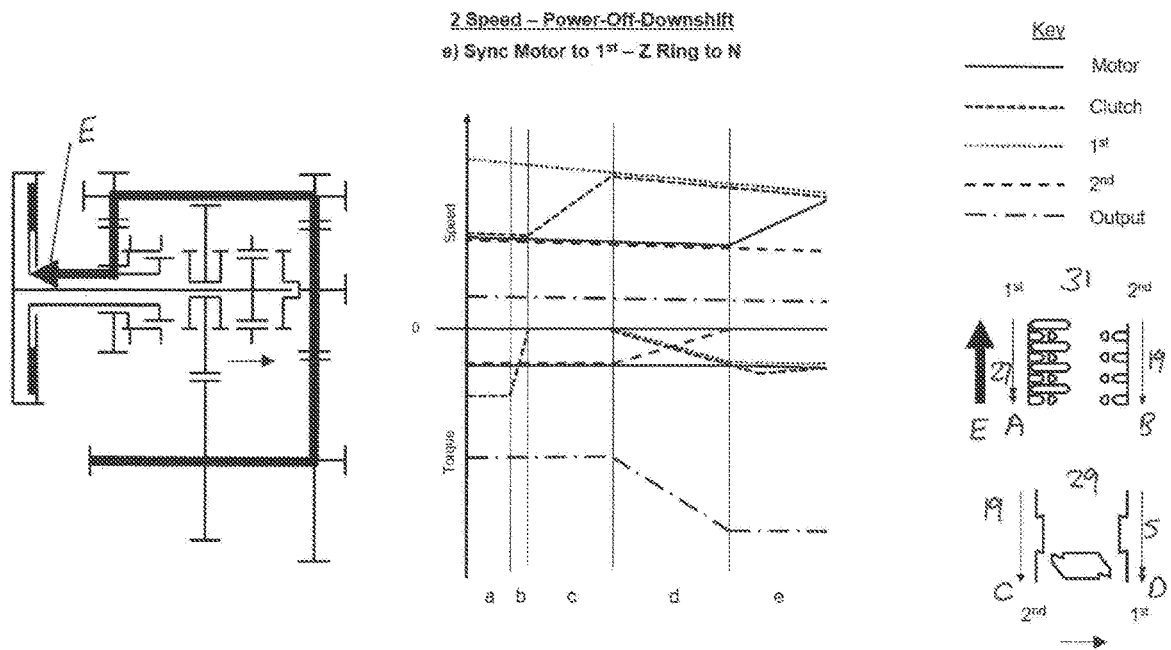
Figure 7F:
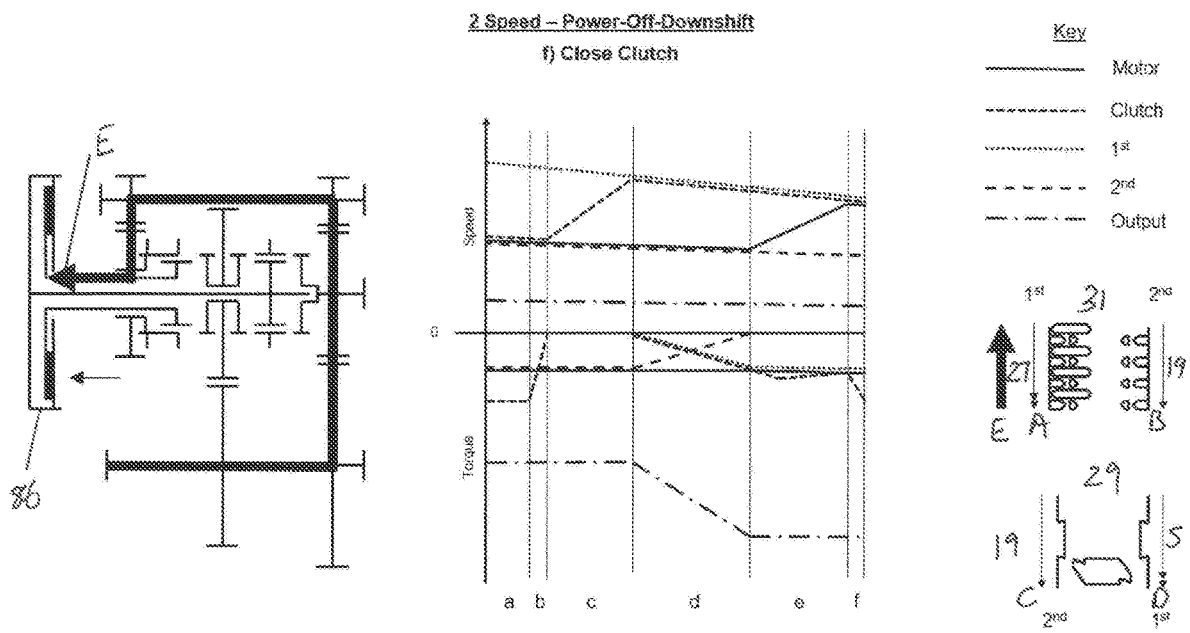
Figure 7G:
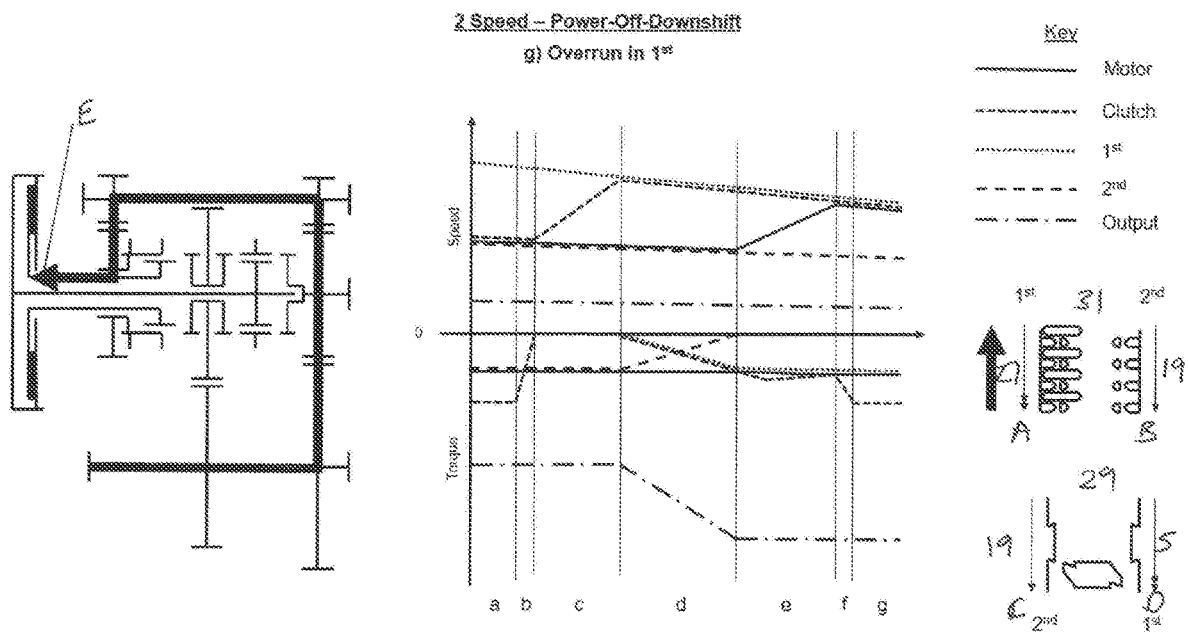
Figure 8:
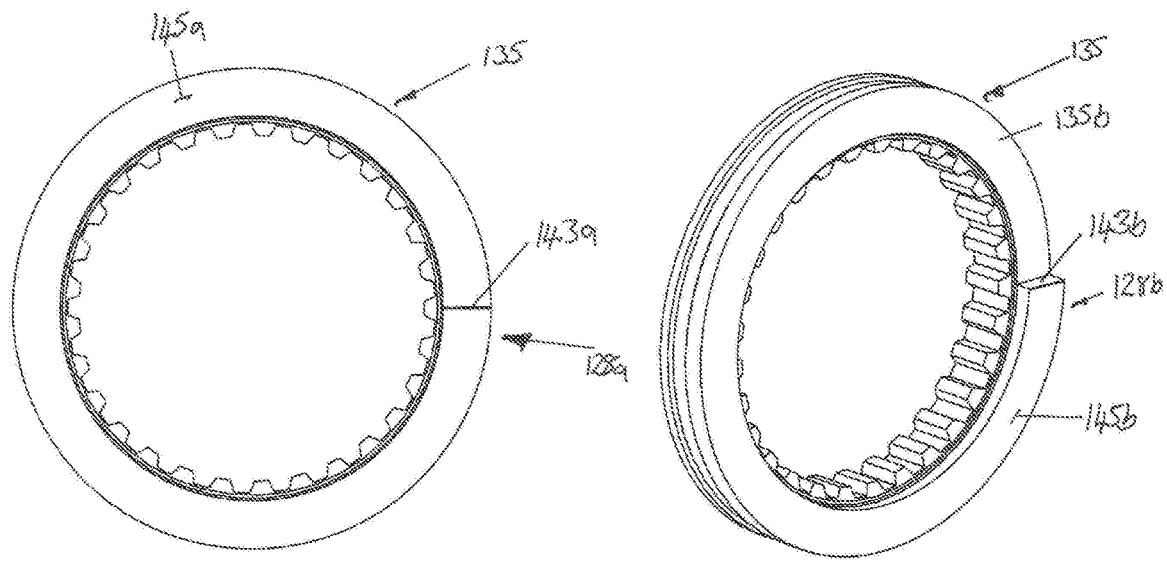

FIGS. 3a and 3b provide 4 views of the gear selector ring of FIG. 2;

FIGS. 4 to 4g show the steps and torque pathways for a power on upshift in the 2 speed transmission system of FIG. 1a;

FIGS. 5 to 5g show the steps and torque pathways for a power on downshift in the 2 speed transmission system of FIG. 1a;

FIGS. 6 to 6g show the steps and torque pathways for a power off upshift in the 2 speed transmission system of FIG. 1a;

FIGS. 7 to 7g show the steps and torque pathways for a power off downshift in the 2 speed transmission system of FIG. 1a; and FIG. 8 provides isometric and plan views of an alternative engagement ring that can be used in a second embodiment of the invention.

Figure 1B:
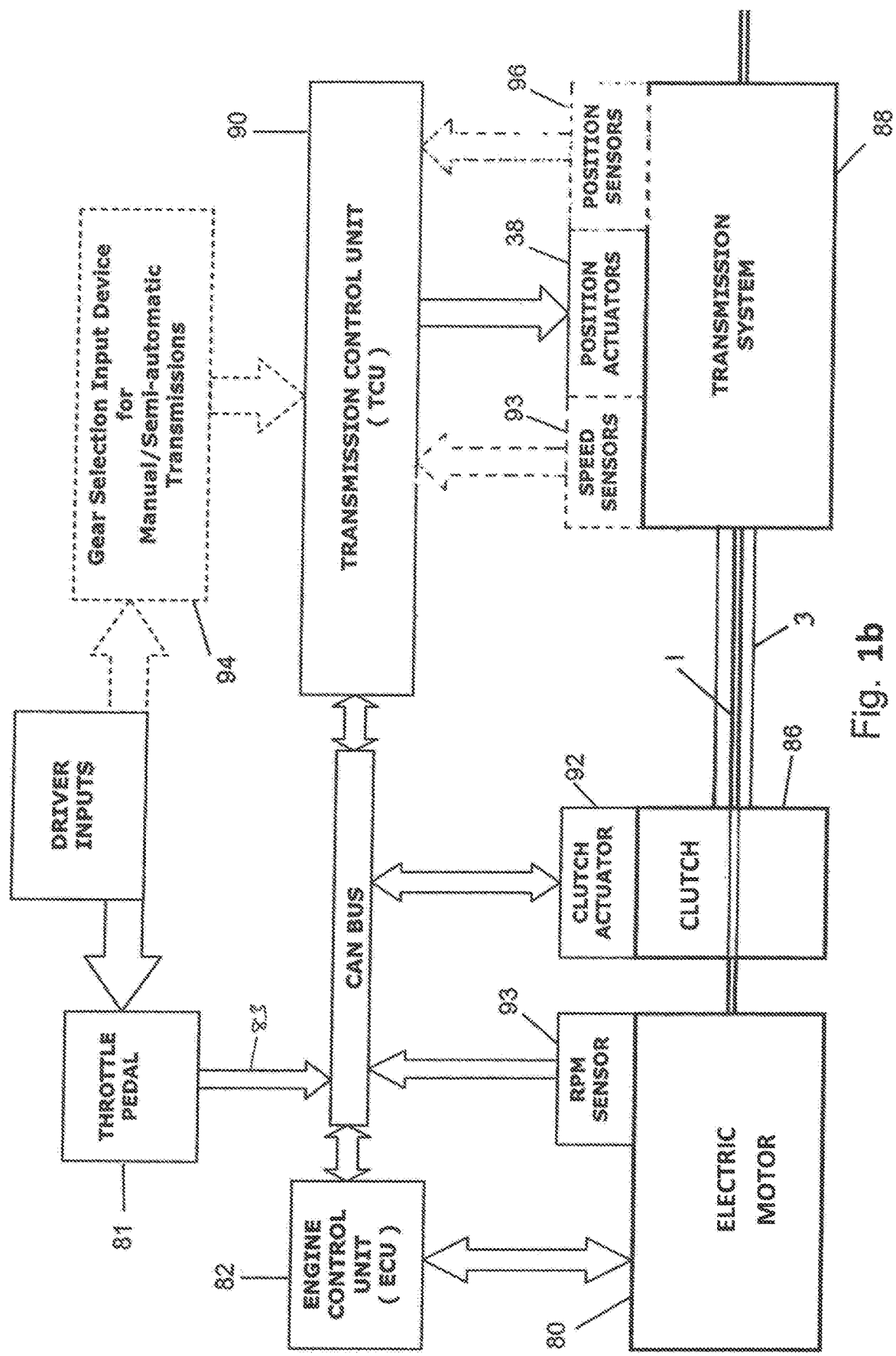
FIG. 1b is a schematic of a drive train including the 2 speed transmission system of FIG. 1a and a control system for the drive train.

FIG. 1b shows schematically a drive system including a drive train having a drive source 80, a clutch 86, and a transmission 88.

The drive source 80 is typically an electric motor in a vehicle but may be other suitable drive source. The output of the drive source 80 is largely determined by the driver loading a throttle input device 81, typically a throttle pedal, which is connected to the drive source via a throttle interface 83 and a drive source control unit 82. The drive source control unit 82, such as an engine control unit or a motor control unit, is arranged to monitor and adjust the output of the drive source 80 in accordance with instructions received from the user and/or a transmission control unit 90. The drive source control unit 82 may be a throttle potentiometer type system or alternatively an electronic control system, which is sometimes called a "drive by wire" system.

The drive source control unit 82 communicates with the transmission control unit 90 via a Controller Area Network (CAN) bus.

The layout of the transmission 88 is shown schematically in FIG. 1a. The transmission 88 includes a first input shaft 1, a second input shaft 3, a first lay shaft 5, a second lay shaft 7 and an output shaft 9.

The layout depicted in FIG. 1 is a two-speed transmission 88, which is suited for use with an electric vehicle. The transmission 88 includes first and 2nd gears. 1st gear includes a gear element 15 mounted on the first lay shaft 5, and fixed for rotation therewith, and a gear element 17 mounted on the output shaft 9 and fixed for rotation therewith. 2nd gear includes a gear element 19 rotatably mounted on the first input shaft 1 via a bearing, and a gear element 21 mounted on the output shaft 9 and fixed for rotation therewith.

The output shaft 9 is connected to a differential which transmits drive to vehicle wheels via axels.

The first input shaft 1 is directly connected to the drive source 80. By directly connected it is meant there is an uninterruptible drive from the drive source 80 to the transmission 88. In practicable terms, torque from the drive source does not pass through the friction plates of the clutch 86, it may however pass through other intermediate components that provide a non-slippable drive between the drive source and the transmission, such as gears, shafts, etc.

The second input shaft 3 is connected to the drive source 80 via an interruptible torque pathway. Typically the second input shaft 3 is connected to the drive source 80 via a slippable drive such as the friction clutch 86, which may be a dry friction clutch or a wet friction clutch. Drive from the drive source 80 to the transmission 88 is interruptible by the friction clutch 86.

Preferably the second input shaft 3 is tubular and houses at least part of the first input shaft 1, the arrangement being such that the first and second input shafts 1,3 are substantially co-axial. This is a very compact arrangement.

A gear element 23 is fixed for rotation with the second lay shaft 7 and meshes with the gear element 15. A gear element 25 is fixed for rotation with the second lay shaft 7 and meshes with a gear element 27. The gear element 27 is rotatably mounted on the second input shaft 3 via a bearing.

Preferably the gear ratio of the gear element 15 to the gear element 23 is the same as the gear ratio of the gear element 27 to the gear element 25.

The transmission 88 includes a torque path linking 2nd gear to the second input shaft 3. For example, the torque path can include the second selector assembly 31 and the gear element 19.

A first selector assembly 29 is mounted on the first input shaft 1. The first selector assembly 29 is arranged to selectively provide a torque path between 1st gear and the first input shaft 1, for example by selectively locking the gear element 19 for rotation with the first input shaft 1. The first selector assembly 29 is arranged to selectively provide a torque path between 2nd gear and the first input shaft 1, for example by selectively locking the first lay shaft 5 for rotation with the first input shaft 1. This can be achieved for example by the first selector assembly 29 selectively engaging drive formations 20 connected with the first lay shaft 5. In an alternative arrangement, the drive formations 20 can be mounted on the gear element 15. The first selector assembly 29 is a novel selector assembly and is described further below. The first selector assembly 29 is arranged to provide torque support during at least some gearshift types. The first selector assembly 29 can be moved to a neutral position.

A second selector assembly 31 is mounted on the second input shaft 3. The second selector assembly 31 is arranged to selectively provide a torque path between 1st gear and the second input shaft 3, for example by selectively locking the gear element 27 for rotation with the second input shaft 3. The gear elements 23,25,27, the second selector assembly 31 and the second lay shaft 7 provide the torque path between 1st gear and the second input shaft 3. The second selector assembly 31 is arranged to selectively provide a torque path between 2nd gear and the second input shaft 3, for example by selectively locking the gear element 19 for rotation with the second input shaft 3.

The second selector assembly 31 is typically a conventional selector assembly, for example a conventional synchromesh type selector assembly. The gears 19,27 include appropriate drive formations 22 and synchronising cones 24 to compliment those of the second selector assembly 31. Because of the transmission layout, the synchronising cones can be small. Also, only one type of synchronising cone is required.

Although the second selector assembly 31 is preferably of the synchromesh type, other types of selector assembly can be used.

The first selector assembly 29 is arranged to engage a first set of drive formations 20a located on the gear element 19. The first selector assembly 29 is arranged to engage a second set of drive formations 20b located on the first lay shaft 5, and thereby transmit torque to the gear element 15. The drive formations 20a,20b comprise first and second sets of dogs. The dogs 20a,20b in each set typically comprise three dogs evenly circumferentially distributed about the gear face/shaft, i.e. the angles subtended between the centres of a pair of dogs is approximately 120 degrees (see FIG. 3). Three dogs are used because the arrangement provides relatively large engagement windows, that is the spaces between the dogs, to receive engagement elements from the first selector assembly 29. Also, three dogs provide inherent self-centring and even load distribution. Large engagement windows provide greater opportunities for the first selector assembly 29 to fully engage the gear 19 and the first lay shaft 5 before transmitting drive thereto. It will of course be appreciated that a different number of dogs 20a,20b can be used.

The first selector assembly 29 is mounted on the first input shaft 1 in between the first set of dogs 20a mounted on the gear element 19 and the second set of dogs 20b mounted on the first lay shaft 5.

The first selector assembly 29 consists of a single gear selector ring 35 (see FIGS. 3a and 3b) and an actuator mechanism 38 (see FIG. 2), which is arranged to move the gear selector ring 35. The gear selector ring 35 is mounted on the first input shaft 1 and is moveable along the axis of the first input shaft 1 by the actuator mechanism 38. The gear selector ring 35 has a main body 35d, a first side 35a that faces towards gear 19 and a second side 35b that faces towards gear 15. The gear selector ring 35 includes a first set of engagement elements 28a on the first side 35a. The gear selector ring 35 includes a second set of engagement elements 28b on the second side 35b. The first set of engagement elements 28a are evenly circumferentially distributed about the first side 35a of the gear selector ring. The second set of engagement elements 28b are evenly circumferentially distributed about the second side 35b of the gear selector ring.

In FIG. 3a, it can be seen that three engagement elements 28a,28b are provided on each side 35a,35b of the engagement ring. Typically, each side 35a,35b of the engagement ring includes one to four engagement elements 28a,28b. An embodiment having a single engagement element 28a,28b on each side 35a,35b of the engagement ring is shown in FIG. 8. Typically, the engagement elements 28a,28b are uniformly distributed about a circumferentially peripheral portion of each side 35a,35b of the engagement ring. Having a low number of engagement element 28a,28b on each side 35a,35b of the engagement ring reduces the frequency with which an engagement element 28a,28b engages dogs 20a, 20b in a slipping condition and provides for larger engagement windows. Typically the number of dogs 20a,20b matches the number of engagement members 28a,28b formed on a respective side or an engagement ring 35.

Each engagement element 28a,28b includes a drive face 43a,43b and a ramp 45a,45b.

The drive faces 43a,43b are arranged to drivingly engage the dogs 20a,20b. The drive faces 43a,43b are planar and are preferably arranged perpendicularly to the respective first and second sides of the gear selector ring 35. Preferably the drive faces 43a,43b are radially arranged. That is, each face 43a,43b is aligned with a respective radius of the engagement ring 35. In some embodiments the drive faces may be angled to complement dogs 20a,20b having angled sides. This can help to reduce wear of the engagement elements 28a,28b when they rotate into engagement, there is face-to-face contact to reduce wear.

The purpose of the ramps 45a,45b is to prevent locking engagement between the drive formations 20a,20b and the gear selector ring 35 in one rotational direction, that is, in a rotational direction opposite to the rotational direction in which the drive faces 43 are oriented. Thus the ramps 45a,45b are non-driving faces. Each ramp 45a,45b slopes away from its respective drive face 43a,43b in the direction opposite to the rotational direction in which the drive faces 43a,43b are oriented. Each ramp 45a,45b slopes gradually towards the base of an adjacent drive face 43a,43b. The angle of slope is substantially constant along each ramp 45a,45b. The upper surface of each ramp 45a,45b is substantially planar. Each ramp 45a,45b follows an arcuate path around a part of the circumference of it respective side 35a,35b of the gear selector ring 35. The arcuate extent AE of the path is typically in the range 90° to 360° degrees. The arcuate extent AE of the path may be determined by the number of engagement elements 28a,28b on each side 35a,35b of the engagement ring. For example, for arrangements having four engagement elements 28a,28b per side 35a,35b the arcuate extent AE of each non-driving face is typically around 90°. For embodiments having three engagement elements 28a,28b per side 35a,35b the arcuate extent AE of each non-driving face is typically in the range 90° to 120°. For embodiments having two engagement elements 28a,28b per side 35a,35b the arcuate extent AE of each non-driving face is typically in the range 150° to 180°.

The first set of engagement elements 28a is arranged on the first side 35a of the gear selector ring such that the drive faces 43a of the first set of engagement elements 28a all face in a first rotational direction. The first set of engagement elements 28a are arranged on the first side 35a of the engagement ring such that the ramps 45a of the first set of engagement elements 28a all slope to a lower height in a second rotational direction, which is opposite to the first rotational direction. The ramps 45a slope from a respective drive face 43a towards an adjacent drive face 43a. In use, when there is relative rotational movement between the first set of engagement elements 28a and the first set of dogs 20a that causes the ramps 45a to move in the second rotational direction in a manner wherein the drive faces 43a do not drivingly engage the first set of dogs 20a, the first set of dogs 20 slide across the ramps 45a. the sloped surfaces of the ramps 45a causes the gear selector ring 35 to move axially along the input shaft 1 by a small amount away from the gear 19. As the dogs 20a slide pass the drive faces 43a, the ring 35 moves axially along the input shaft by a small amount towards gear 19. Thus the ramps 45a provide a ratcheting effect, and the first selector assembly 29 is arranged to slip relative to its associated gear/shaft under certain operational conditions.

The second set of engagement elements 28b is arranged on the second side 35b of the gear selector ring such that the drive faces 43b of the second set of engagement elements 28b all face in the second rotational direction. The second set of engagement elements 28b are arranged on the second side 35b of the gear selector ring such that the ramps 45a of the second set of engagement elements 28b all slope to a lower height in the first rotational direction, which is opposite to the second rotational direction, from a respective drive face 43b. The ramps 45b slope to towards an adjacent drive face 43b. In use, when there is relative rotational movement between the second set of engagement elements 28b and the second set of dogs 20b that causes the ramps 45b to move in the first rotational direction, so the drive faces 43b do not drivingly engage the second set of dogs 20b of the first lay shaft 5, the dogs 20b slide across the ramps 45b. The sloped surfaces of the ramps 45b cause the gear selector ring 35 to move axially along the input shaft 1 by a small amount away from the first lay shaft 5. As the dogs 20b slide pass the drive faces 43b, the ring 35 moves axially along the input shaft by a small amount towards gear 19. Thus the ramps 45b provide a ratcheting effect, and the first selector assembly 29 is arranged to slip relative to its associated gear/shaft under certain operational conditions.

The first and second sets of engagement elements 28a,28b have a similar configuration but are opposite handed. For example, the first set of engagement elements 28a can be arranged to engage the first set of dogs 20a during deceleration (reverse torque direction) and the second set of engagement elements 28b can be arranged to engage the second set of dogs 20b during acceleration (forward torque direction).

Preferably the drive faces 43a on the first side 35a of the engagement ring are rotationally offset from the drive faces 43b on the second side 35b of the engagement ring. Typically each drive face 43a on the first side 35a of the engagement ring 35 is located approximately halfway between respective adjacent the drive faces 43b on the second side 35b of the engagement ring.

The gear selector ring 35 includes internal splines 36. A sleeve member 200 is provided that includes internal splines 201 for a splined connection with the first input shaft 1, and external splines 203 for a splined connection with the internal splines 36 of the engagement ring 35 (see FIG. 3b). This provides a very robust connection between the engagement ring 35 and the first input shaft 1. The splined arrangement 36,201,203 enables the engagement ring 35 to move axially along first input shaft 1 while rotationally locking the engagement ring 35 for rotation with the first input shaft 1 according to operation of the actuator mechanism 38.

The gear selector ring 35 has a groove 35c formed in its outer curved surface that extends circumferentially around the curved surface.

The first selector assembly 29 has the following modes of operation:
1. Locking gear 19 for rotation with the first input shaft 1 in the first rotational direction, but not locking the gear 19 for rotation with the first input shaft 1 in the second rotational direction;
2. Neutral; and
3. Locking the first lay shaft 5 for rotation with the first input shaft 1 in the second rotational direction, but not locking the first lay shaft 5 for rotation with the first input shaft 1 in the first direction.

It will be apparent from the above description that first selector assembly 29 cannot lock the gear 19 for rotation with the first input shaft 1 in both of the first and second rotational directions, nor can it lock the first lay shaft 5 for rotation with the first input shaft 1 in both of the first and second rotational directions. Thus the first selector assembly 29 has a different structure and operating modes from known instantaneous selector assemblies. The new arrangement is a simplified selector assembly.

The actuator mechanism 38 is arranged to control the movement of the gear selector ring 35. The actuator mechanism 38 includes a shift fork 48, a shift cradle 100 and a shift drum 102. Optionally the actuator mechanism 38 may include resilient means, such as helical springs 104. The springs 104 are arranged to bias the shift fork 48, and hence the gear selector ring 35, into a neutral position. The springs 104 are located in the shift cradle 100. The shift fork 48 mates with the groove 35c and drives the gear selector ring 35 axially according to the rotational orientation of the shift drum 102. The shift drum 102 controls operation of the shift fork 48. The shift drum 102 has a relatively simple construction because movement of the ring 35 is reversible. An advantage of the current arrangement is that only a single shift drum 102 is required to obtain all of the necessary movement of the selector ring 35 when providing torque support during gearshifts.

Movement of the gear selector ring 35 is controlled by the transmission control unit 90 for automatic and semi-automatic versions of the transmission 88, however with this layout it is possible to have an entirely manual transmission, in which case the transmission control unit is not strictly required.

The transmission control unit 90 is an electronic logic control system driven by software that is arranged to control operation of the actuator mechanism 38 and hence the gear selector ring 35.

For fully automatic transmissions 88 gear selections are made by the transmission control unit 90 when the drive source control unit 82 detects predetermined operational conditions, for example when the drive source 80 reaches a particular speed in a particular gear. For semi-automatic transmissions 88 gear selections are made by the user of the drive system by initiating the gear selection input device 94, for example a gear lever (manual) or switches located adjacent the steering wheel (semi-automatic). The transmission 88 can be arranged such that it is possible to select between the automatic and manual modes.

The transmission 88 is arranged to provide torque support to the output shaft 9 during at least some shift types. During operation of the transmission 88, the first and second input shafts 1,3 can be considered sources of torque from which torque can be provided selectively to the $1^{st}$ and $2^{nd}$ gears. The transmission 88 is arranged to change torque path during a gearshift, for at least some shift types, from a first torque path that includes one of the first and second input shafts 1,3, to a second torque path that includes the other of the first and second input shafts 1,3, to a third torque path that includes the one of the first and second input shafts 1,3. For example, in preferred arrangements when driving normally in 1st gear, torque is provided to 1st gear along a first torque path that includes the second input shaft 3. During a gearshift, for at least some shift types, the torque path is changed temporarily from the first torque path to a second torque path that includes the first input shaft 1. This is achieved by operating the first selector assembly 29, the second selector assembly 31 and/or the clutch 86. This provides torque support to the output shaft 9 during the gearshift. Subsequently the torque path is changed again to a third torque path for the driving in $2^{nd}$ gear. The third torque path includes the second input shaft 3. When driving normally in 2nd gear, torque is provided to 2nd gear along a first torque path that includes the second input shaft 3. During a gearshift, for at least some shift types, the torque path is changed temporarily from the first torque path to a second torque path that includes the first input shaft 1. This is achieved by operating the first selector assembly 29, second selector assembly 31 and/or the clutch 86. This provides torque support to the output shaft 9 during the gearshift. Subsequently the torque path is changed again to a third torque path for the driving in 1st gear. The third torque path includes the second input shaft 3. This switching between input shafts 1,3 (torque sources) from the second input shaft 3 to the first input shaft 1 and then back to the second input shaft 3, will be explained further below.

Operation of the transmission will now be described with reference to FIGS. 4 to 7g. In FIGS. 4 to 7g the stages marked "a" to "g" on the graphs correspond with respective Figures a to g showing the positions of the first and second selector assemblies 29,31 with respect to gear elements 19,27 and lay shaft 5, and hence gear element 15, at the corresponding stage.

FIGS. 4 to 4g show a power on upshift strategy from 1st gear to 2nd gear.

FIG. 4a shows the initial condition of the transmission when the power on upshift is requested. The clutch 86 is closed, the second selector assembly 31 is in engagement with the gear element 27, the gear selector ring 35 of the first selector assembly 29 is in a neutral position. The torque path through the transmission 88 is second input shaft 3, second selector assembly 31, gear elements 27,25, the second lay shaft 7, gear elements 23,15,17 and the output shaft 9. The arrows A and B in FIG. 4a show the relative speeds of the gear element 27 and 19. The double-headed arrow A indicates that the gear element 27 is rotating faster than the gear element 19. The arrows C and D in FIG. 4a indicate the direction and relative rotational speeds of the gear element 19 and the first lay shaft 5 (and hence gear element 15). The double-headed arrow D indicates that the first lay shaft 5 is rotating faster than the gear element 19. The arrow E indicates the direction of torque. The next step is to engage the first lay shaft 5 with gear selector ring 35 and to open the clutch 86 (FIG. 4b). The second selector assembly 31 does not move at this stage. The effect of opening the clutch 86 on relative torques and speeds of the drive source 80, clutch 86, 1st gear, 2nd gear and output are shown in the graph. The torque path through the transmission 88 changes to the first input shaft 1, the first selector assembly 29, the first lay shaft 5, gear elements 15,17 and output shaft 9. The next step is for the clutch 86 to be synchronised with the speed of $2^{nd}$ gear (gear element 19). This is achieved by moving the second selector assembly 31 out of engagement with the gear element 27 and into engagement with the gear element 19 (FIG. 4c). The clutch 86 torque capacity is then gradually increased to substantially match the clutch torque to the drive source torque (FIG. 4d). The torque path through transmission 88 is then changed to the second input shaft 3, the second selector assembly 31, gear elements 19,21 and the output shaft 9. The speed of the drive source 80 is then synchronised to the speed of the 2nd gear (gear element 19) and the gear selector ring 35 is moved out of engagement with the first lay shaft 5 to a neutral position (FIG. 4e). The clutch 86 is then closed (FIG. 4f) and the shift is completed (FIG. 4g). Thus torque is supplied to the output shaft 9 continually throughout the shift. This helps to improve the performance of the vehicle.

FIGS. 5 to 5g show a power on downshift strategy from 2nd gear to 1st gear.

FIG. 5a shows the torque path when driving in $2^{nd}$ gear. Torque passes from the drive source 80, through the clutch 86, the second input shaft 3, the second selector assembly 31 and gear elements 19 and 21 (2nd gear) to the output shaft 9. The second selector assembly 31 engages the gear element 19. When a shift request is made, the clutch torque capacity 86 is reduced so that the clutch 86 is set to a slip condition (FIG. 5b). The speed of the drive source 80 is then synchronised to the speed of 1st gear (and hence first lay shaft 5) and the first selector assembly 29 is actuated to engage the first lay shaft 5 with gear selector ring 35 (FIG. 5c). The clutch 86 torque capacity is then reduced until the clutch 86 is fully opened (FIG. 5d). As this happens, the output torque begins to rise as does the torque generated by 1st gear. The torque path through the transmission 88 changes to first input shaft 1, first selector assembly 29, first lay shaft 5, gear elements 15,17 and the output shaft 9. The clutch speed is then synchronised to 1st gear (and hence first lay shaft 5) and the second selector assembly 31 is operated to disengage the gear element 19 and to select the gear element 27 (FIG. 5e). The clutch 86 torque capacity is then quickly increased until the clutch 86 is closed and the first selector assembly 29 is actuated to move the first selector ring 35 out of engagement from the first lay shaft 5 into a neutral position. The torque path through the transmission changes to the second input shaft 3, second selector assembly 31, gear elements 27,25, the second lay shaft 7, gear elements 23,15,17 and the output shaft 9. (FIG. 8f). Shift completed (FIG. 8g). Thus torque is supplied to the output shaft 9 continually throughout the shift. This helps to improve the performance of the vehicle.

FIGS. 6 to 6*g* show the steps in a power off upshift from 1st gear to 2nd gear.

FIG. 6 provides an overview for the power off upshift. FIG. 6*a* shows the condition of the transmission 88 at the shift request. The transmission is in overrun. The torque path through the transmission 88 is from the output shaft 9, gear elements 17,15,23, the second lay shaft 7, gear elements 25,27, the second selector assembly 31 to the second input shaft 3. That is, the opposite path to that shown in FIG. 4*a* because the direction of torque is opposite. The first selector assembly 29 is in neutral. At the time of the request, the clutch 86 is closed. After the request, the clutch 86 torque capacity is reduced until a slip condition is achieved (FIG. 6*b*). The drive source 80 is synchronised to 2nd gear (gear element 19) and the first selector assembly 29 is actuated to move gear selector ring 35 into engagement with gear element 19 (FIG. 6*c*). The clutch 86 torque capacity is then reduced until the clutch 86 is fully open (FIG. 6*d*). The torque path through the transmission changes. The new torque path is from the output shaft 9, gear elements 21,19, the first selector assembly 29 to the first input shaft 1. The clutch speed is synchronised to 2nd gear (gear element 19) and the second selector assembly 31 disengages the gear element 27 and engages the gear element 19 (FIG. 6*e*). The clutch 86 is then closed and the first selector assembly 29 is actuate to move the gear selector ring 35 into a neutral position (FIG. 6*f*). Shift completed (FIG. 6*g*). Thus torque is supplied to one of the first and second input shafts 1,3 throughout the shift. Feeding torque back to the input shafts 1,3 during a shift enables the torque to be used in the vehicle drivetrain, for example to recharge a battery in an electric vehicle. This makes positive use of energy that would otherwise be wasted.

FIGS. 7 to 7*g* show the steps in a power off downshift from 2nd gear to 1st gear.

FIG. 7*a* shows the condition of the transmission 88 when the shift request is made. The overrun torque path is from the output shaft 9, gear elements 21,19, first selector assembly 29 to the first input shaft 1. The pathway is opposite to that shown in FIG. 5*a* since the direction of torque is opposite. The second selector assembly 31 is in engagement with gear element 19, the gear selector ring 35 is in a neutral condition and the clutch 86 is closed. The first selector assembly 29 is actuated to move the gear selector ring 35 into engagement with gear element 19 and the clutch 86 torque capacity is reduced until the clutch 86 is opened (FIG. 7*b*). The clutch speed is then synchronised to 1st gear speed (speed of first lay shaft 5). The second selector assembly 31 disengages the gear element 19 and engages the gear element 27 (FIG. 7*c*). The clutch torque is then substantially matched to the drive source torque (FIG. 7*d*). The torque path changes. Torque through the transmission travels from output shaft 9, the gear elements 17,15,23, second lay shaft 7, gear elements 25,27, second selector assembly 31 to the second input shaft 3. The drive source speed is then substantially matched to 1st gear speed (speed of first lay shaft 5) and the first selector assembly 29 is actuated to disengage the gear element 19 by moving the gear selector ring 35 to neutral (FIG. 7*e*). The clutch torque capacity is increased until the clutch is fully closed (FIG. 7*f*). Shift complete FIG. 7*g*. Thus torque is supplied to one of the first and second input shafts 1,3 throughout the shift. Feeding torque back to the input shafts 1,3 during a shift enables the torque to be used in the vehicle drivetrain, for example to recharge a battery in an electric vehicle. This makes positive use of energy that would otherwise be wasted.

It will be appreciated by the skilled person that torque spikes are substantially eliminated by the speed synchronisation steps in the shift strategies prior to engaging the new gear. Synchronisation is possible because the transmission layout provides two drive input paths: one directly from the drive source and the other from the drive source via the clutch device. It also enables at least some torque to be supplied to the output shaft during a shift, which ensures that there is no loss of drive during a shift.

The transmissions can be used in vehicle and non-vehicle applications. Typical vehicles include cars, lorries, motorcycles, buses, vans, all wheel drive vehicles, tractors, construction vehicles, excavation vehicles, military vehicles. Non-vehicle applications include manufacturing machines, wind turbines, etc.

A second embodiment is shown in FIG. 8. The second embodiment is similar to the first embodiment except that the engagement ring 135 of the first selector assembly only includes one engagement element 128*a*,128*b* on each side of the ring 135*a*,135*b*. Likewise, the associated gears only have one dog formed thereon. This provides very large engagement windows to engage the gears, which suits electric vehicle applications are the relative speeds between gears can be large. Also, it also reduces the level of noise generated when the ring 135 is ratcheting out of engagement with the adjacent gear element since the collision frequency with the dog is reduced. For embodiments having one engagement element 128*a*,128*b* per side 135*a*,135*b* the arcuate extent AE of the ramps 145*a*,145*b* can be in the range 90° to 360° and is typically in the range 300° to 360°. Each ramp 145*a*,145*b* extends from its respective drive face 143*a*,143*b* approximately through a full circumference of its respective side 135*a*,135*b*.

The invention claimed is:

1. A transmission system, including:
    a first input shaft that is arranged to receive drive directly from a drive source;
    a second input shaft that is arranged to receive drive from the drive source via a drive interruption means;
    a first lay shaft;
    a gear element rotatably mounted on the first input shaft;
    a gear element mounted on the first lay shaft; and
    a first selector assembly arranged to selectively lock the gear element rotatably mounted on the first input shaft for rotation with the first input shaft and to selectively lock the gear element mounted on the first lay shaft for rotation with the first input shaft,
    the first selector assembly comprising a single engagement ring that includes:
        a first side including a first set of engagement elements, wherein each engagement element in the first set of engagement elements includes a first drive face arranged to drivingly engage in a first rotational direction a first set of drive formations associated with the gear element rotatably mounted on the first input shaft and a first non-driving face that is arranged to slip with respect to the first set of drive formations in a second rotational direction, thereby preventing driving engagement with the first set of drive formations, and
        a second side including a second set of engagement elements, wherein each engagement element in the second set of engagement elements includes a second drive face arranged to drivingly engage in the second rotational direction a second set of drive formations associated with the gear element mounted on the first lay shaft and a second non-driving face that is arranged to slip with respect to the second set of drive formations in the first rotational direction, thereby preventing driving engagement with the second set of drive formations, wherein each of the first non-driving faces extends circumferentially along a first arcuate path from a first position adjacent its respective first drive face, and the arcuate extent of each first non-driving face is in the range 90° to 360°, and wherein each of the second non-driving faces extends circumferentially along a second arcuate path from a second position adjacent its respective second drive face, and the arcuate extent of each second non-driving face is in the range 90° to 360°.

2. A transmission system according to claim 1, wherein each of the first non-driving faces extends circumferentially along its respective first arcuate path from the first position to a third position adjacent the first drive face of an adjacent one of the engagement elements in the first set of engagement elements, and wherein each of the second non-driving faces extends circumferentially along its respective second arcuate path from the second position to a fourth position adjacent the second drive face of an adjacent one of the engagement elements in the second set of engagement elements.

3. A transmission system according to claim 1, wherein each of the first non-driving faces extends along the first arcuate path at a peripheral portion of the first side of the engagement ring, and wherein each of the second non-driving faces extends along the second arcuate path at a peripheral portion of the second side of the engagement ring.

4. A transmission system according to claim 1, wherein the number of engagement elements on the first side of the engagement ring is less than or equal to two, and wherein the number of engagement elements on the second side of the engagement ring is less than or equal to two.

5. A transmission system according to claim 1, wherein each first non-driving face slopes away from its respective first drive face in the second rotational direction, and wherein each second non-driving face slopes away from its respective second drive face in the first rotational direction.

6. A transmission system according to claim 5, wherein the angle of slope of each first non-driving face along its respective circumferentially extending first arcuate path is constant, and wherein the angle of slope of each second non-driving face along its respective circumferentially extending second arcuate path is constant.

7. A transmission system according to claim 1, wherein each first non-driving face is substantially planar along its first arcuate path, and wherein each second non-driving face is substantially planar along its second arcuate path.

8. A transmission system according to claim 1, wherein each first drive face is planar and is arranged radially from the centre of the engagement ring, and wherein each second drive face is planar and is arranged radially from the centre of the engagement ring.

9. A transmission system according to claim 1, wherein the engagement ring includes internal splines arranged to engage external splines formed on the first input shaft or with an intermediate component in the form of a sleeve member located between the engagement ring and the first input shaft, said sleeve member including internal splines for a splined connection with the first input shaft and external splines for a splined connection with the internal splines of the engagement ring.

10. A transmission system according to claim 1, including an actuator mechanism for controlling axial movement of the engagement ring, wherein the actuator mechanism includes a shift fork engaged with the engagement ring and a single shift drum for controlling movement of the shift fork and engagement ring.

11. A transmission system according to claim 1, consisting of a 2-speed transmission system.

12. A transmission system according to claim 1, including a gear element rotatably mounted on the second input shaft and a second selector assembly for selectively locking the gear element mounted on the second input shaft for rotation with the second input shaft.

13. A transmission system according to claim 12, wherein the second selector assembly is a conventional synchromesh or dog clutch type assembly selector assembly.

14. A transmission system according to claim 13, wherein the second selector assembly is arranged to selectively lock the gear element rotatably mounted on the first input shaft for rotation with the second input shaft.

15. A transmission system according to claim 1, including an output shaft.

16. A transmission system according to claim 15, including a gear element mounted on the output shaft, which meshes with the gear element mounted on the first lay shaft, wherein $1^{st}$ gear in the transmission includes the gear element mounted on the first lay shaft and the gear element mounted on the output shaft, which meshes with the gear element mounted on the first lay shaft; including a gear element mounted on the output shaft, which meshes with the gear element rotatably mounted on the first input shaft, wherein $2^{nd}$ gear in the transmission includes the gear element rotatably mounted on the first input shaft and the gear element mounted on the output shaft, which meshes with the gear element rotatably mounted on the first input shaft.

17. A transmission system according to claim 1, including: a second lay shaft.

18. A transmission system according to claim 17, including: a gear element mounted on the second lay shaft, which meshes with the gear element rotatably mounted on the second input shaft; and a gear element mounted on the second lay shaft, which meshes with the gear element mounted on the first lay shaft.

19. A transmission system according to claim 1, wherein one of the first and second input shafts is tubular and houses at least part of the other of the first and second input shafts, wherein at least part of the first and second input shafts are substantially co-axial.

20. A transmission system according to claim 15, wherein, when in overrun in 1st gear, torque is routed from an output shaft to the second input shaft via the 1st gear train or via the second layshaft; and when driving in $1^{st}$ gear, torque is routed from the second input shaft to the output shaft via the second lay shaft.

21. A transmission system according to claim 15, wherein transmission is arranged such that, when driving in 2nd gear, torque is routed from the second input shaft to the output shaft via the gear element rotatably mounted on the first input shaft; and when in overrun in $2^{nd}$ gear, torque is routed from the output shaft to the second input shaft via the gear element rotatably mounted on the first input shaft.

22. A transmission system according to claim 15, arranged to supply torque continually to the output shaft during a power on upshift from $1^{st}$ gear to $2^{nd}$ gear, and arranged to supply torque continually to the output shaft during a power on downshift from $2^{nd}$ gear to 1st gear.

23. A transmission system according to claim 1, arranged to supply torque to at least one of the first and second input shafts during a power off upshift from $1^{st}$ gear to $2^{nd}$ gear, and arranged to supply torque to at least one of the first and second input shafts during a power off downshift from $2^{nd}$ gear to $1^{st}$ gear.

24. A transmission system according to claim 17, arranged during a power on upshift, to switch torque flow from a first torque path that includes the second input shaft, the second lay shaft and the gear element mounted on the first lay shaft, to a second torque path that includes the first input shaft and the gear element mounted on the first lay shaft, to a third torque path that includes the second input shaft and the gear element rotatably mounted on the first input shaft.

25. A transmission system according to claim 24, arranged during a power on downshift, to switch torque flow from a first torque path that includes the second input shaft and the gear element rotatably mounted on the first input shaft, to a second torque path that includes the first input shaft and the gear element mounted on the first lay shaft, to a third torque path that includes the second input shaft, the second lay shaft and the gear element rotatably mounted on the first lay shaft.

26. A transmission system according to claim 25, arranged during a power off upshift, to switch torque flow from a first torque path that includes the second input shaft, the second lay shaft and the gear element mounted on the first lay shaft, to a second torque path that includes the first input shaft and the gear element mounted on the first input shaft, to a third torque path that includes the second input shaft and the gear element rotatably mounted on the first input shaft.

27. A transmission system according to claim 26, arranged during a power off downshift, to switch torque flow from a first torque path that includes the second input shaft and the gear element rotatably mounted on the first input shaft, to a second torque path that includes the first input shaft and the gear element mounted on the first input shaft, to a third torque path that includes the second input shaft, the second lay shaft and the gear element rotatably mounted on the first lay shaft.

28. A transmission system according to claim 24, including operating at least one of the first selector assembly, the second selector assembly and the drive interruption means to switch between the first, second and third torque paths.

29. A transmission system according to claim 1, wherein each non-drive face comprises a ramp.

30. A transmission system according to claim 1, wherein the drive faces on the first side of the engagement ring are rotationally offset from the drive faces on the second side of the engagement ring.

31. A drive train including a drive source, a friction clutch device and a transmission system according to claim 1, wherein the friction clutch device comprises a wet friction clutch or a dry friction clutch.

32. An electric vehicle including a drive train according to claim 31, wherein the drive source includes an electric motor.

33. A transmission system, including:
a first input shaft that is arranged to receive drive directly from a drive source;
a second input shaft that is arranged to receive drive from the drive source via a drive interruption means;
a first lay shaft;
a gear element rotatably mounted on the first input shaft;
a gear element mounted on the first lay shaft; and
a first selector assembly arranged to selectively lock the gear element rotatably mounted on the first input shaft for rotation with the first input shaft and to selectively lock the gear element mounted on the first lay shaft for rotation with the first input shaft,
the first selector assembly comprising a single engagement ring that includes:
a first side including a first set of engagement elements, wherein each engagement element in the first set of engagement elements includes a first drive face arranged to drivingly engage in a first rotational direction a first set of drive formations associated with the gear element rotatably mounted on the first input shaft and a first non-driving face that is arranged to slip with respect to the first set of drive formations in a second rotational direction, thereby preventing driving engagement with the first set of drive formations, and
a second side including a second set of engagement elements, wherein each engagement element in the second set of engagement elements includes a second drive face arranged to drivingly engage in the second rotational direction a second set of drive formations associated with the gear element mounted on the first lay shaft and a second non-driving face that is arranged to slip with respect to the second set of drive formations in the first rotational direction, thereby preventing driving engagement with the second set of drive formations,
wherein each of the first non-driving faces extends circumferentially along a respective first arcuate path from a first position adjacent its first drive face to a third position adjacent the first drive face of an adjacent one of the engagement elements in the first set of engagement elements, and
wherein each of the second non-driving faces extends circumferentially along a respective second arcuate path from a second position adjacent its second drive face to a fourth position adjacent the second drive face of an adjacent one of the engagement elements in the second set of engagement elements.

34. A transmission system, including:
a first input shaft that is arranged to receive drive directly from a drive source;
a second input shaft that is arranged to receive drive from the drive source via a drive interruption means; a first lay shaft;
a gear element rotatably mounted on the first input shaft;
a gear element mounted on the first lay shaft;
a first selector assembly arranged to selectively lock the gear element rotatably mounted on the first input shaft for rotation with the first input shaft and to selectively lock the gear element mounted on the first lay shaft for rotation with the first input shaft,
the first selector assembly comprising a single engagement ring that includes:
a first side including a first set of engagement elements, wherein each engagement element in the first set of engagement elements includes a first drive face arranged to drivingly engage in a first rotational direction a first set of drive formations associated with the gear element rotatably mounted on the first input shaft and a first non-driving face that is arranged to slip with respect to the first set of drive formations in a second rotational direction, thereby preventing driving engagement with the first set of drive formations, and a second side including a second set of engagement elements, wherein each engagement element in the second set of engagement elements includes a second drive face arranged to drivingly engage in the second rotational direction a second set of drive formations associated with the gear element mounted on the first lay shaft and a second non-driving face that is arranged to slip with respect to the second set of drive formations in the first rotational direction, thereby preventing driving engagement with the second set of drive formations, wherein each of the first non-driving faces extends circumferentially along a respective first arcuate path from a first position adjacent its first drive face, wherein each of the second non-driving faces extends circumferentially along a respective second arcuate path from a second position adjacent its second drive face, wherein the number of engagement elements on the first side of the engagement ring is less than or equal to two, and wherein the number of engagement elements on the second side of the engagement ring is less than or equal to two.

\* \* \* \* \*